(12) United States Patent
Cao et al.

(10) Patent No.: US 12,151,376 B2
(45) Date of Patent: Nov. 26, 2024

(54) AUGMENTED REALITY INTERFACE FOR AUTHORING TASKS FOR EXECUTION BY A PROGRAMMABLE ROBOT

(71) Applicant: Purdue Research Foundation, West Lafayette, IN (US)

(72) Inventors: Yuanzhi Cao, West Lafayette, IN (US); Karthik Ramani, West Lafayette, IN (US); Zhuangying Xu, Redmond, WA (US)

(73) Assignee: Purdue Research Foundation, West Lafayette, IN (US)

( * ) Notice: Subject to any disclaimer, the term of this patent is extended or adjusted under 35 U.S.C. 154(b) by 244 days.

(21) Appl. No.: 17/050,320

(22) PCT Filed: Apr. 23, 2019

(86) PCT No.: PCT/US2019/028802
§ 371 (c)(1),
(2) Date: Oct. 23, 2020

(87) PCT Pub. No.: WO2019/209882
PCT Pub. Date: Oct. 31, 2019

(65) Prior Publication Data
US 2021/0109520 A1    Apr. 15, 2021

Related U.S. Application Data

(60) Provisional application No. 62/661,082, filed on Apr. 23, 2018.

(51) Int. Cl.
*G05D 1/00*    (2024.01)
*B25J 9/16*    (2006.01)
(Continued)

(52) U.S. Cl.
CPC .......... *B25J 9/1661* (2013.01); *B25J 9/1664* (2013.01); *B25J 9/1689* (2013.01); *B25J 13/089* (2013.01);
(Continued)

(58) Field of Classification Search
CPC ... B25J 9/1664; G05D 1/0038; G05D 1/0044; G05D 1/0274; G06F 3/04847
See application file for complete search history.

(56) References Cited

U.S. PATENT DOCUMENTS 10,310,507 B2 *   6/2019   Kleiner ................ G05D 1/0219
10,395,383 B2 *   8/2019   Alibay ..................... G06T 7/70
(Continued)

OTHER PUBLICATIONS

Patent Cooperation Treaty, International Search Report issued in PCT/US2019/028802, Aug. 2, 2019, pp. 1-2.
(Continued)

*Primary Examiner* — Khoi H Tran
*Assistant Examiner* — Aaron G Cain
(74) *Attorney, Agent, or Firm* — Pillsbury Winthrop Shaw Pittman LLP

(57) ABSTRACT

Disclosed is a visual and spatial programming system for robot navigation and robot-IoT task authoring. Programmable mobile robots serve as binding agents to link stationary IoT devices and perform collaborative tasks. Three key elements of robot task planning (human-robot-IoT) are coherently connected with one single smartphone device. Users can perform visual task authoring in an analogous manner to the real tasks that they would like the robot to perform with using an augmented reality interface. The mobile device mediates interactions between the user, robot (s), and IoT device-oriented tasks, guiding the path planning
(Continued)

execution with Simultaneous Localization and Mapping (SLAM) to enable robust room-scale navigation and interactive task authoring.

28 Claims, 19 Drawing Sheets

(51) Int. Cl.
    *B25J 13/08*     (2006.01)
    *B25J 19/02*     (2006.01)
    *G05D 1/223*     (2024.01)
    *G05D 1/225*     (2024.01)
    *G05D 1/246*     (2024.01)
    *G06F 3/04847*     (2022.01)
    *G06F 3/0486*     (2013.01)

(52) U.S. Cl.
    CPC .......... *B25J 19/023* (2013.01); *G05D 1/0038* (2013.01); *G05D 1/0044* (2013.01); *G05D 1/0251* (2013.01); *G05D 1/0274* (2013.01); *G05D 1/223* (2024.01); *G05D 1/225* (2024.01); *G05D 1/246* (2024.01); *G05D 1/2465* (2024.01); *G06F 3/04847* (2013.01); *G06F 3/0486* (2013.01)

(56) References Cited

U.S. PATENT DOCUMENTS

| | | | |
|---|---|---|---|
| 10,477,342 B2* | 11/2019 | Williams | A63F 9/12 |
| 10,896,543 B2* | 1/2021 | Kuffner | G06F 1/163 |
| 2012/0197439 A1 | 8/2012 | Wang et al. | |
| 2016/0167234 A1 | 6/2016 | Angle et al. | |
| 2018/0074508 A1* | 3/2018 | Kleiner | G05D 1/2246 |
| 2018/0344116 A1* | 12/2018 | Schriesheim | G05D 1/0044 |

OTHER PUBLICATIONS

Patent Cooperation Treaty, International Written Opinion issued in PCT/US2019/028802, Aug. 2, 2019, pp. 1-6.

\* cited by examiner

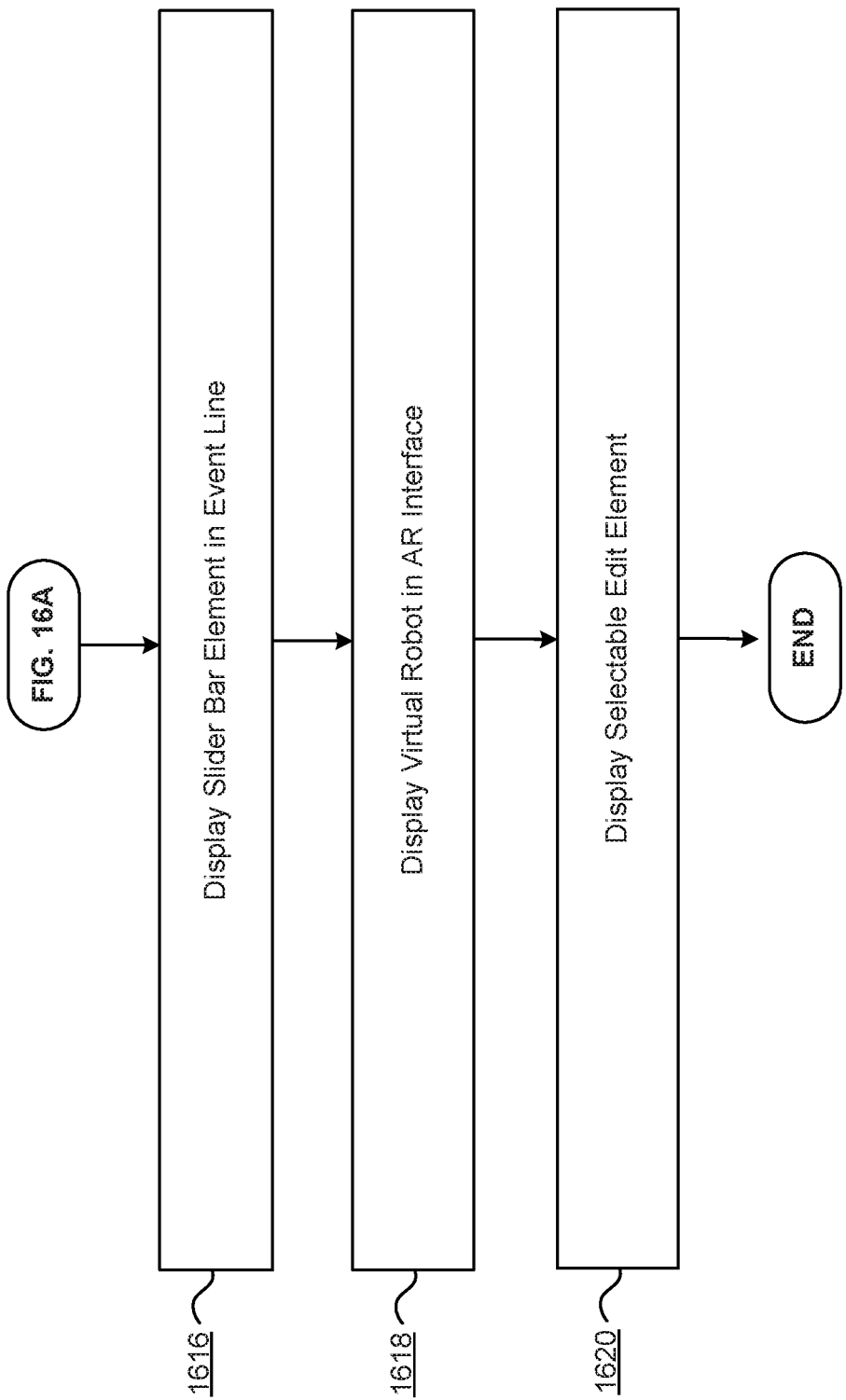

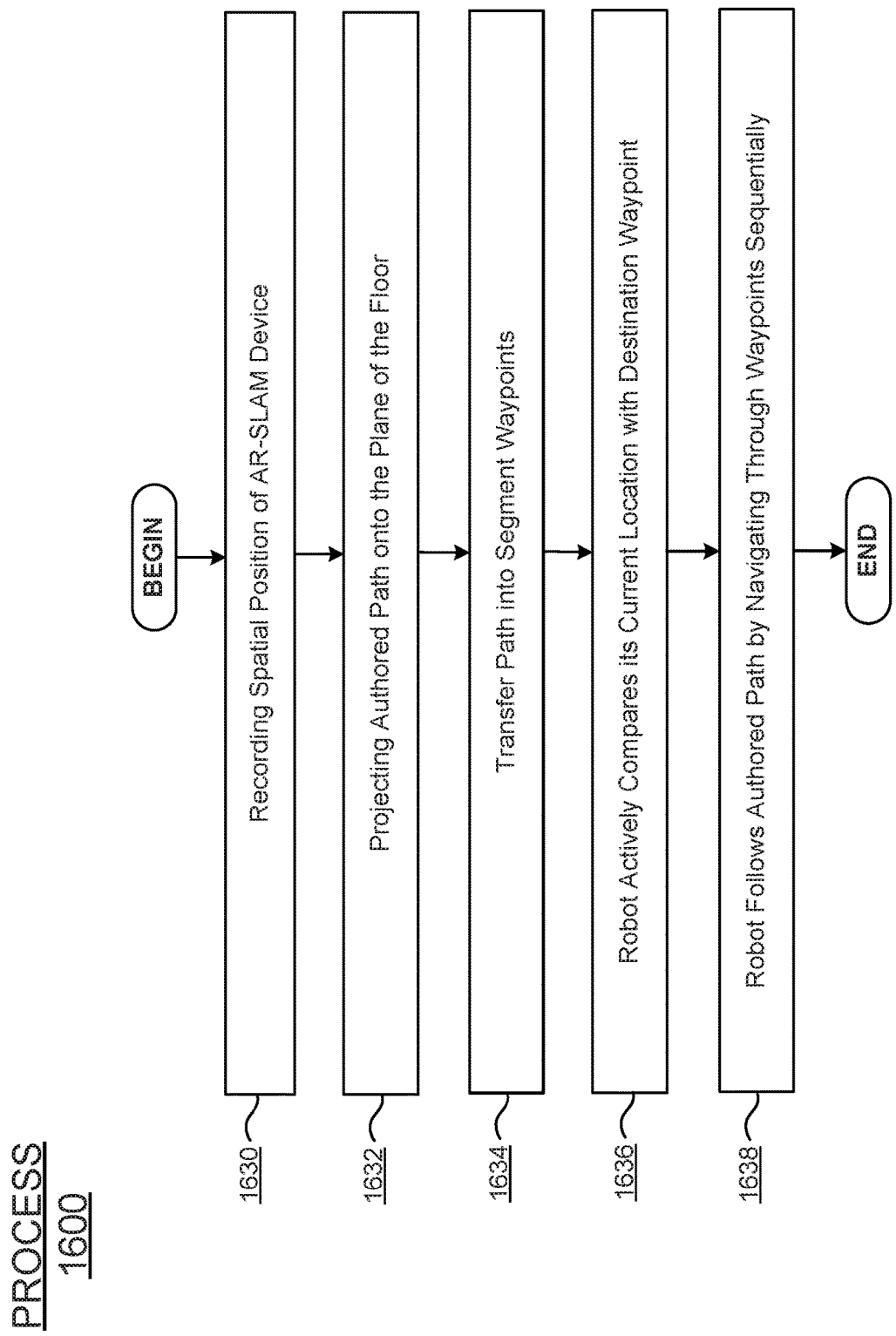

AUGMENTED REALITY INTERFACE FOR AUTHORING TASKS FOR EXECUTION BY A PROGRAMMABLE ROBOT

CROSS REFERENCE TO RELATED APPLICATIONS

This application is a U.S. National Phase patent application of PCT/US2019/028802, filed Apr. 23, 2019, which claims priority to U.S. Provisional Application No. 62/661,082 filed Apr. 23, 2018, both of which are hereby incorporated by reference in the present disclosure in their entirety.

U.S. GOVERNMENT RIGHTS

This invention was made with government support under contract number IIP 1632154 awarded by the National Science Foundation. The government has certain rights in the invention.

BACKGROUND

Technical Field

Embodiments described in this disclosure relate generally to a system for robot navigation and task planning, and more particularly to an authoring system for robot navigation and task planning using a mobile device with augmented-reality simultaneous localization mapping ("AR-SLAM") capabilities.

Brief Description of the Related Art

The concept of Internet of Robotic Things has not been widely explored in practice across the IoT and robotics communities, and as such, heretofore authoring systems for robot-IoT interactive task planning remain underdeveloped. Due to limited perception capabilities and current limitations in artificial intelligence ("AI"), ad-hoc tasks which humans take for granted remain challenging for robots. Previous work in this field has introduced external vision systems for tracking robots using a live camera view in a user interface. But this approach limits the authoring scene to the perspective of the camera only which is usually fixed. Another previous work, "Magic Cards," proposed an implicit command authoring workflow with humans manually and spatially placing tags in a physical environment for facilitating robot navigation. In this method, however, the tracking from an overhanging camera was prone to occlusion, especially in a cluttered scene such as a household environment. Further, recent research has employed augmented reality ("AR") interfaces and associated robots within an AR scene, for example, using hand-held or head-mounted devices. Although the mobility allowed users to move around and author distributed tasks from different perspectives, the limited field-of-view of the hand-held or head-mounted devices constrained the navigation range for the robot.

Other known techniques include equipping robots with on-board simultaneous localization and mapping ("SLAM") capabilities which separate the authoring interface from the navigation for robot tasks. Users could refer to a scanned SLAM map of a real scene in a physical environment for authoring context for robot tasks and the robot(s) could conduct those tasks using the same SLAM map. However, once created the pre-scanned SLAM map remained static and could not adapt to changes in the physical environment. Indeed, such systems have been hampered by outdated SLAM maps.

Further, conventional Internet of Things ("IoT") devices allow access and control through mobile interfaces. But presently such interfaces are designed without considering robot interactions with the IoT devices. With additional web-based services, users could coordinate devices working with other productivity tools or social media via active human-IoT communications. Even in these coordinated methods, however, IoT tasks are rather spatially independent. In these cases, conventional interfaces therefore mostly suffice the IoT-only interactions which may be insensitive to spatial distributions.

In addition, a scheme known as "Reality Editor" has been developed that enable users to visually program stationary IoT devices which are affixed with fiducial markers. In a similar manner, robots have been attached with tags that can be tracked through users' AR camera view. But the robots and IoT devices remain locally registered in the AR only to resolve the spatial relationship between a robot and the IoT devices and users had to keep both of them in the same AR camera view for such schemes to operate correctly. To register multiple agents globally and coordinate them spatially, some alternatives including external tracking systems such as infrastructured cameras or pre-scanned and manually tagged maps of the environment have been proposed. But these approaches further constrain deploying robots to ad-hoc tasks in our daily environment.

Also, previous work in this field has explored accessing and controlling IoT devices through digital representations superimposed on AR scenes. But the augmentation relied on maintaining the IoT devices in the AR camera view, thus only allowing for local interactions in a limited volume.

SUMMARY OF THE DESCRIPTION

At least certain embodiments described in this disclosure relate to an AR interface for authoring tasks for execution by a programmable mobile robot in a physical environment. In other embodiments, an AR interface for authoring tasks for execution by a programmable mobile robot in a physical environment is disclosed.

The aspects, features, and advantages of the disclosed embodiments will become apparent to those of ordinary skill in the art from the following description of specific embodiments in conjunction with the accompanying figures.

BRIEF DESCRIPTION OF THE DRAWINGS

FIGS. 16A-16C depict flow charts of example embodiments of a process for authoring navigation and robot-IoT interactive tasks for the programmable mobile robot to perform in a physical environment in accordance with the teachings of this disclosure.

DETAILED DESCRIPTION

Figure 1:
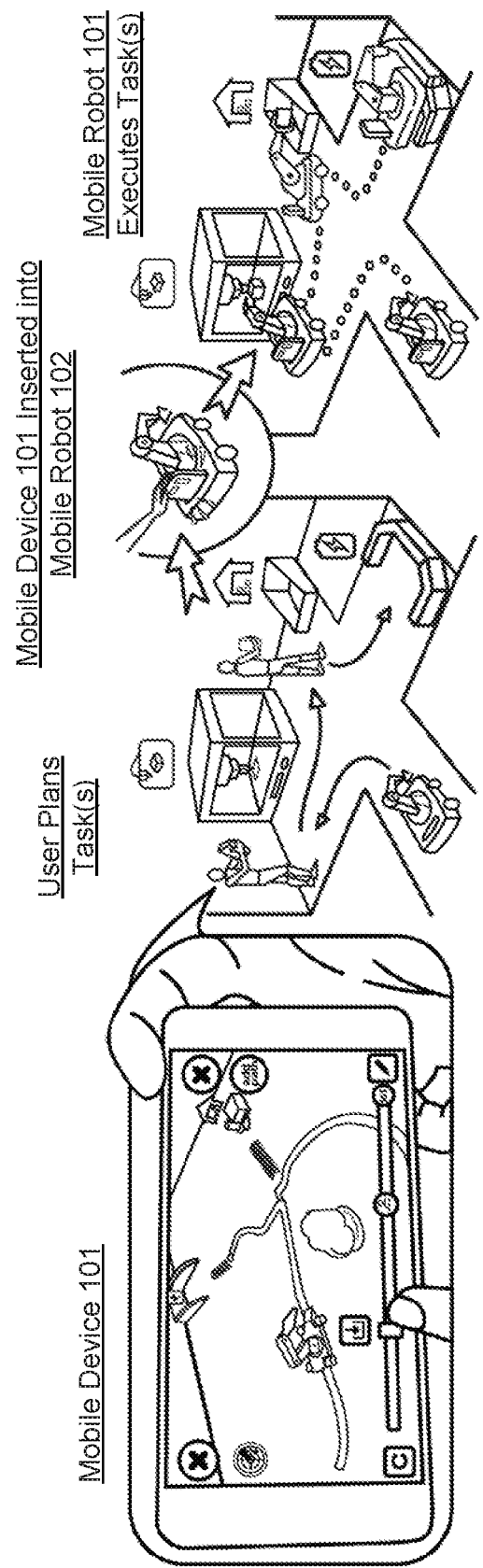
FIG. 1 depicts a conceptual block diagram of an example embodiment of a workflow for an authoring system for programmable robot navigation and robot-IoT interactive task planning in accordance with the teaching of this disclosure.

Throughout this description numerous details are set forth in order to provide a thorough understanding of the various embodiments of this disclosure, which are provided as illustrative examples so as to enable those of skill in the art to practice the embodiments. It will be apparent to those skilled in the art that the techniques described in this disclosure may be practiced without some of these specific details, or in other instances well-known structures and devices may be shown in block diagram form to avoid obscuring the principles and techniques described in this disclosure. The figures and examples provided in this disclosure are not intended to limit its scope to any single embodiment, as other embodiments are possible by way of interchange of some or all of the described or illustrated elements. Moreover, applicants do not intend for any term in the specification or claims to be ascribed an uncommon or special meaning unless such meaning is explicitly set forth herein.

In at least certain aspects, an authoring system is disclosed for robot navigation and robot-IoT task planning using a mobile device having AR-SLAM capabilities. The authoring system may include an AR authoring interface and a mobile device such as a smartphone. In one embodiment, the mobile device may include an AR interface in which users can spatially author robot tasks, either by explicitly defining navigation pathways for the robot in the AR interface or by implicitly defining the navigation pathways in response to users carrying the AR device around from point to point in the physical environment. In one embodiment, the physical environment may include a distribution of one or more IoT devices as will be described more fully below. These techniques allow for a transparent knowledge transfer between humans and one or more programmable robots using the same AR device as both the 'eyes' and 'brain' of the robot(s).

Further, the adaptability of the robots against changes in the physical environment may be increased based on dynamically updating the SLAM maps. The vision of ubiquitous computing has been rapidly emerging as IoT-based electronics are becoming smaller, lower in cost, and embedded in our everyday environment. Typically, human-IoT interactions take the form of transforming IoT data into informative knowledge, augmenting human sensory capabilities, and assisting humans to make correct and efficient decisions. But IoT devices are mostly stationary and have limited physical interactions, particularly with each other. The emergence of programmable robots of the near future can serve as a medium to conduct coordinated and collaborative tasks with surrounding IoT devices. The robots can communicate with one or more of multiple embedded IoT devices in an environment to create various new workflows as discussed more fully herein.

To command mobile robots to complete distributed tasks, the significance of spatial-awareness for authoring interfaces varies depending on the level of the robots' autonomy. For highly autonomous robots driven by embedded intelligence, users simply need to assign tasks using high-level instructions requiring less spatial information, for example, instructing a "Roomba" robot to vacuum a room in a household or business. However, except for simple specific tasks, robot intelligence remains underdeveloped for a majority of ad-hoc tasks in less controlled environments, such as those present in a daily household or business environment. Therefore, at least certain embodiments described in this disclosure relate to AR interfaces and workflows developed to program robots to overcome these complexities. From this perspective, the contextual visualization and spatial awareness of the environment may be essential, and further, may be utilized to ensure the efficiency of the authoring interface.

In aspects, a coherent authoring interface is provided for specializing in robot-IoT interactions, for example through: (i) sensing capabilities and knowledge embedded within the IoT devices arrayed in the environment to facilitate robots in completing tasks at a semantic level; (ii) IoT devices that may serve as spatial landmarks within which robots can navigate around the environment, and (iii) robot manipulation of the IoT devices or physical interactions with machines and objects in the environment. Heretofore, these newly introduced concepts have not been developed in existing human-IoT or human-robot programming user interfaces.

In aspects, at least certain of the innovative approaches described herein can be configured to leverage advanced SLAM technologies to globally associate users, IoT devices, and robots together. Users may first examine and explore the IoT environment within a mobile AR interface. Then, within the same AR scene, users can seamlessly transfer their insight about the tasks to be accomplished by one or more robots. This may include robot navigation pathway planning as well as semantic knowledge such as situational awareness from robots in relation to the IoT devices. SLAM may also enable an innovative embodied programming modality, namely users can demonstrate a sequential chaining of distributed tasks to the robots by walking up to the IoT devices in the physical environment while carrying the mobile device with the AR interface ("AR device") as set forth more fully below.

In addition, since both AR and robot navigation share commonalities in terms of spatial awareness of the environment, a seamless exchange of human knowledge between the AR device and the navigation module configured on the robot(s) can be supported. Using these techniques and the array of IoT devices in the environment, a robot can obtain a certain perceptive understanding of the environment in which it is operating, and can thereafter execute the planned task(s). The innovations set forth in this disclosure may include one or more of (i) a virtual robotic assistant workflow that uses an AR-SLAM-capable mobile device for robot-IoT task authoring and execution, and (ii) an authoring interface design that enables robot pathway planning, logic-driven event scheduling, task chaining, and knowledge transfer to one or more programmable mobile robots, as well as spatial awareness and contextual feedback.

In aspects, the AR interface can be configured to be spatially and physically aware of the physical environment. In stationary industrial robot programming, for example, AR motion planning enables users to preview generated trajectories and examine potential discrepancies and collisions before the robot begins its navigation in the physical environment. Embodiments also focus on authoring interactive tasks for visiting distributed IoT devices in the environment and allow local manipulation to be handled by robot itself. While simple graphical augmentation can be superimposed onto a video streamed from an external camera system or projected to the environment, the embodiments described herein can be adapted to follow a mobile AR approach wherein a handheld or head-mounted AR device may be configured to allow users to freely move around within an environment and to inspect augmentations from multiple perspectives.

Virtual Robotic Assistant Walk-Through. FIG. 1 depicts a conceptual block diagram of an example embodiment of a workflow for an authoring system for programmable robot navigation and robot-IoT interactive task planning in accordance with the teaching of this disclosure. The authoring system may also be referred to in this disclosure in certain places as a "virtual robotic assistant system." Using an AR-SLAM mobile device 101, users can first spatially plan task(s) for one or more robots in the AR interface of the mobile device 101 and place the mobile device onto a mobile robot 102. The mobile robot 102 can thereafter execute instructions received from the mobile device 101 to perform one or more navigation and/or robot-IoT interactive tasks in the physical environment. The robot(s) may be mobile and programmable. In certain aspects, the robot(s) may be equipped with a modular slot adapted to receive the mobile AR device via a physical connection with the modular slot connection through which instructions can be transferred to the robot(s) from the mobile device. In other cases, the AR device ma communicate task information as instructions to the robot(s) over one or more wired or wireless computer networks via a network communications interface configured on the robot(s). In either case, robot navigation may be guided by the AR-SLAM features on the mobile device.

In some embodiments, the robot functions may be limited to basic motor functions. In such cases, the mobile device 101 may act as the "brain" of the robot 102. In other cases, the robot 102 may include more advanced functionality such as network communication interfaces for receiving instructions from the mobile device 101 over one or more wired or wireless networks (not shown).

Users may first select a robot for performing one or more desired tasks from any of the available robots located nearby in a physical environment. This allows an AR authoring interface to be specialized based on the capabilities of the selected robot. In aspects, the IoT devices present in the environment can be registered into the SLAM map through a one-time scanning of a QR code. Note, as used herein a "QR code" refers to a machine-readable code consisting of black and white shapes (squares) that are used for storing information readable by computers.

Users can access embedded knowledge from the IoT devices in the AR view. Using the authoring interface, users can formulate a group of navigation paths, robot-IoT interactions, and other time and logic constructs to achieve the desired robot-IoT coordination. After the authoring is finished, users can physically place the authoring AR device 101 into a modular slot configured on the robot 102 for receiving and communicating with the AR device. The system can thereafter communicate instructions from the mobile AR device to guide the robot to execute one or more tasks. In one embodiment, the modular slot of the robot 102 may be configured to receive instructions from the AR device 101 over one or more interfaces (not shown) with the robot in order to facilitate programming the robot 102 to perform the tasks as indicated by the instructions. The tasks can also be configured to be communicated to the robot 102 via one or more wired or wireless computer networks via a network communications interface.

Because of the transparency between user intent and robot actions in the AR authoring phase, in at least certain embodiments robot programming can be achieved in a what-you-do-is-what-the-robot-does ("WYDWRD") manner. The system may operate in a self-contained and plug-and-play manner to avoid environmental dependencies and to allow for in-situ authoring in the AR interface. Less dependence on the environment is preferred so that the system can be immediately used in new environments without any pre-knowledge (especially for handling tasks in a dynamic environment such as performing household chores).

Figure 2:
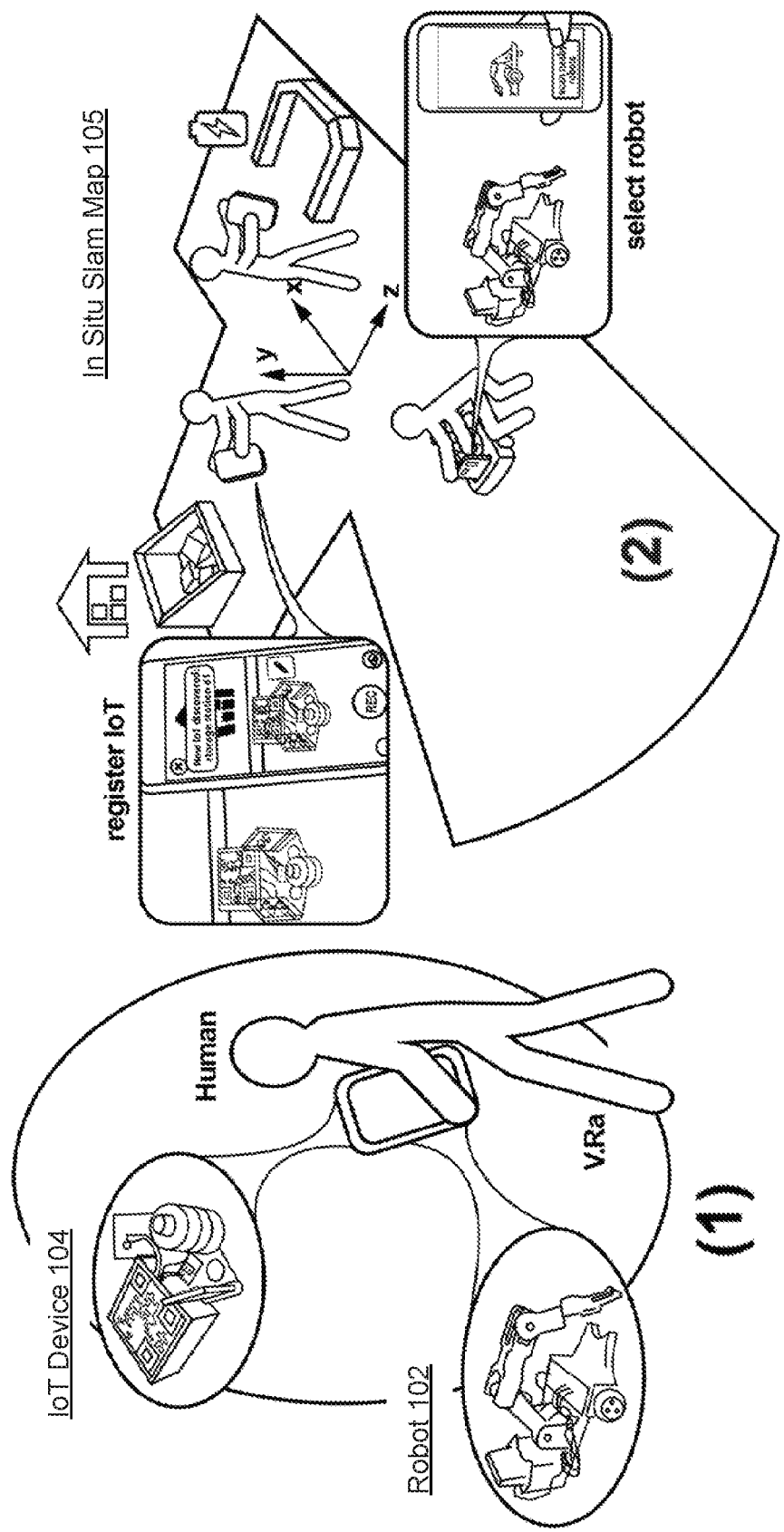
FIG. 2 depicts a conceptual block diagram of an example embodiment of an authoring system for programmable robot navigation and robot-IoT interactive task planning implemented using a mobile device with AR-SLAM capabilities in accordance with the teachings of this disclosure.

FIG. 2 depicts a conceptual block diagram of an example embodiment of an authoring system overview 200 for programmable robot navigation and robot-IoT interactive task planning implemented using a mobile device 101 with AR-SLAM capabilities in accordance with the teachings of this disclosure. This aspect may include storing spatial information for robot navigation and IoT interaction in a dynamically generated SLAM map.

Physical and Spatial Awareness. In one aspect, users' knowledge of the environment may be leveraged to instruct the robot to accomplish tasks in unstructured and/or constantly evolving environments (e.g., a household or business). A physically and spatially aware authoring AR interface allows users to conveniently and accurately express their intent and transfer such intent to the robot(s) using the described techniques as set forth more fully below. In aspects, the system supports users in visually previewing and iterating authored tasks/actions in the AR interface to improve the efficiency of a sequence of distributed tasks. Compared with abstracted task planning tools for professionals of previous techniques, the system described herein emphasizes low cognitive load by closely associating planning interactions with actions of the robots in the physical world. The workflow supports users in temporally and spatially coordinating robots and IoT devices to accomplish multiple tasks (e.g., synergistically) in the daily surroundings of the environment in which the robot is operating.

Within an AR scene, users can simply register IoT devices 104 with a SLAM map 105. By referring to the spatial distribution of the IoT devices 104 and the geometry of the environment in the SLAM map 105, users can plan, preview, and iterate the robot-IoT interactions. In a preferred embodiment, these functions can be performed in-situ in the AR scene presented to the user in the AR interface of the mobile AR device 101. Further, the same AR device 101 can be employed as the 'eye' and 'brain' of the robot to execute the authored task(s). Such interchangeability between an authoring interface and robot navigation module promotes transparent knowledge transfer from users to robot 102. As the SLAM map 105 is dynamically constructed (i.e., on-the-fly), the workflow need not a priori rely on external tracking systems or on an existing spatial map. The system can therefore be easily installed in the new environment and ready for use.

Authoring Interface. To start designing the authoring interface for mobile robot task planning, the basic elements of the task may first be extracted. The nature of the work involves robot planning for physical tasks comprising interacting with different IoT devices at various locations in the environment. The planned task may take a long or short period of time to execute, and may further involve logic conditions that handle unexpected situations dynamically. By referring to previous programming protocols for IoT devices and robots, and catering them to the specific details of the system, nodes may be implemented to represent task elements and to construct one or more task sequences in at least certain embodiments of the disclosed techniques.

Figure 3:
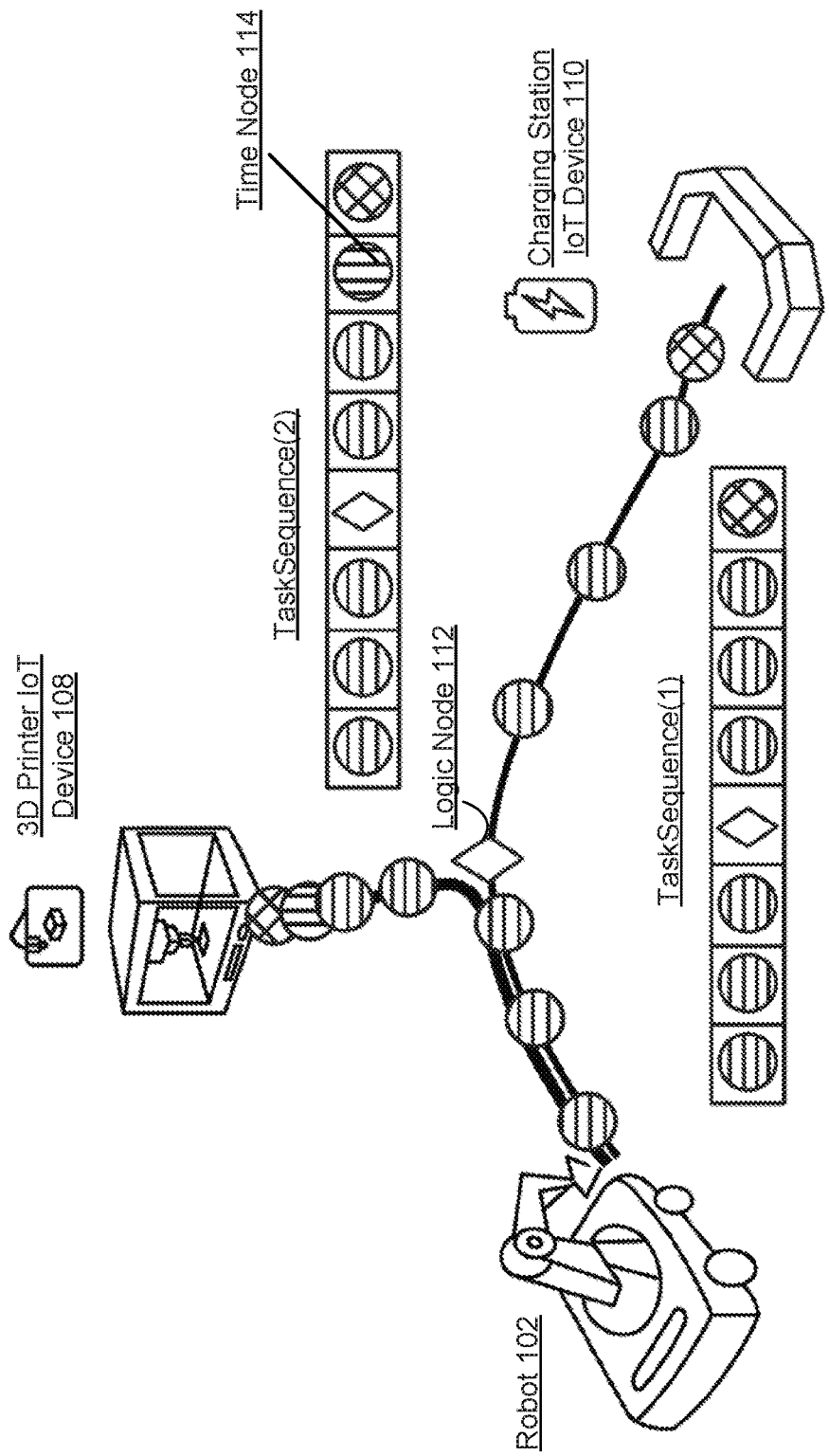
FIG. 3 depicts a conceptual block diagram of an example embodiment showing a logic event with its corresponding task sequences for pathway navigation in an authoring system for programmable robot navigation and robot-IoT interactive task planning in accordance with to the teachings of this disclosure.

FIG. 3 depicts a conceptual block diagram of an example embodiment showing a logic event with its corresponding task sequences for pathway navigation in an authoring system for programmable robot navigation and robot-IoT interactive task planning in accordance with to the teachings of this disclosure. In the illustrated embodiment of FIG. 3, authored tasks can be represented by task sequences 300 and formed by several types of nodes with different functionality. A logic-driven event may be represented by multiple task sequences. For example, in the illustrated embodiment task sequences 300 include task sequence (1) relating to navigating to and interacting with a 3D printer IoT device 108, and task sequence (2) relating to navigating to and interacting with a charging station IoT device 110.

A "navigation node" may be configured to represent a pathway for the robot to traverse during operation. It may contain three-dimensional coordinate information that can be used to guide the robot's navigation during "play" mode. An "action node" may define an action event that relates to the robot or the IoT device at various points along the navigation pathway. In one aspect, the most common action node includes a robot-IoT interaction node. A "time node" may contain information that allows the system to perform time-based behaviors. For example, the robot 101 may be instructed to continue performing a task for a period of time or to wait until an event occurs to perform certain tasks, etc. A "logic node" may contain a user defined condition allowing the system to perform logic-driven tasks such as if condition A occurs, then the robot is instructed to perform action B, etc. These nodes are the basic abstractions that form user authored tasks in embodiments of the virtual robotic assistant system, namely, constructing the task sequence. During the planning phase, users can insert new nodes or remove nodes, or manipulate existing nodes in the task sequence.

When executing in play mode the system can be adapted to guide the robot 102 to run through each node in a sequential manner to accomplish the authored task. The logic-driven events may be realized by multiple task sequences with each one representing one task line. The robot 102 can be configured to evaluate the condition at the logic node 112 and decide which pathway to take in accordance therewith. In this case, the logic node provides a branch between task sequence (1) and task sequence (2). For example, if the robot 102's battery is low it may be programmed to proceed onto task sequence (1) and instruct the robot to traverse over to the charging station IoT device 110; otherwise the robot 102 may instead be instructed to proceed onto tasks sequence (2) to retrieve a 3D-printed component at the 3D printer IoT device 108. Note that a "wait-until" function can be realized by the time node 114 of task sequence (2) shown in the figure.

Figure 4:
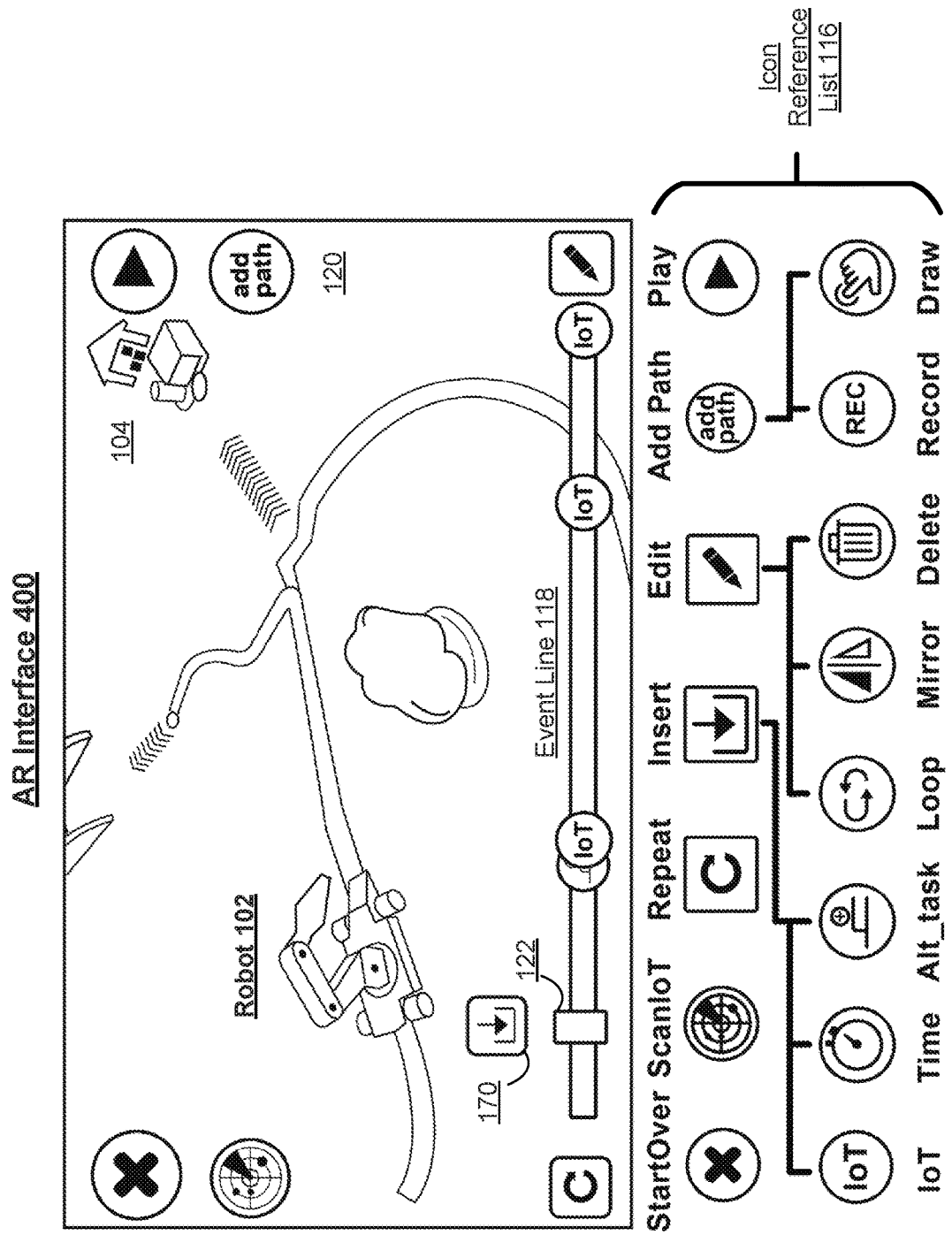
FIG. 4 depicts a conceptual block diagram of an example embodiment of an AR interface for an authoring system for programmable robot navigation and robot-IoT interactive task planning in accordance with the teachings of this disclosure.

Virtual Robotic Assistant Interface and Interaction. FIG. 4 depicts a conceptual block diagram of an example embodiment of an AR interface for an authoring system for programmable robot navigation and robot-IoT interactive task planning in accordance with the teachings of this disclosure. In the illustrated embodiment, the AR interface 400 is shown on the top portion of the figure and an icon reference list 116 for interactive functions of the system is shown on bottom. In the AR view users can create task sequences and preview them. There is also an event line 118 which can be overlaid onto the display of the AR scene to provide an interactive abstraction of the task(s) to be performed by the robot 102.

In aspects, to start a new task planning after selecting a robot, a user can define a pathway for the robot using the "add path" function 120. The pathway can then be generated either by the user spatially walking around in the environment carrying the AR device 101 or by the user hand drawing the pathway in the AR view on the display of the device 101. When interacting with IoT devices 104, users may first scan one or more QR codes (not shown) associated with the particular IoT device using, for example, an IoT device scan function. The IoT device(s) 104 can then be registered into the AR scene. Users may thereafter select a function list associated with each IoT device 104 to insert new robot-IoT interactions.

Users can preview the authored task by dragging the slider bar 122 on the event line 118, insert a new IoT function, time delay, or alternative task sequence at a desired position. Users can also loop, mirror, and/or delete selected event lines 118 using an "edit" function associated with the event line. Users further have the option to create periodic robot tasks (i.e. repeat everyday) using a "repeat" function in order to establish daily routines for the robot. When the user is satisfied with a particular planned task and ready to execute it, play mode can be activated and the mobile AR device 101 can be placed onto the robot 102. The AR device 101 can be placed into the modular slot on the robot 102 that is specially adapted to act as an interface for receiving instructions from the mobile AR device. In other embodiments, this can be done using one or more wired or wireless computer networks. The robot 102 can thereafter initiate execution of the planned tasks by sequentially running the nodes in the task sequence. In one embodiment, navigation and/or action nodes may be inserted in the event line 118 using a selectable icon 170 displayed above the slider bar 122.

Figure 5A:
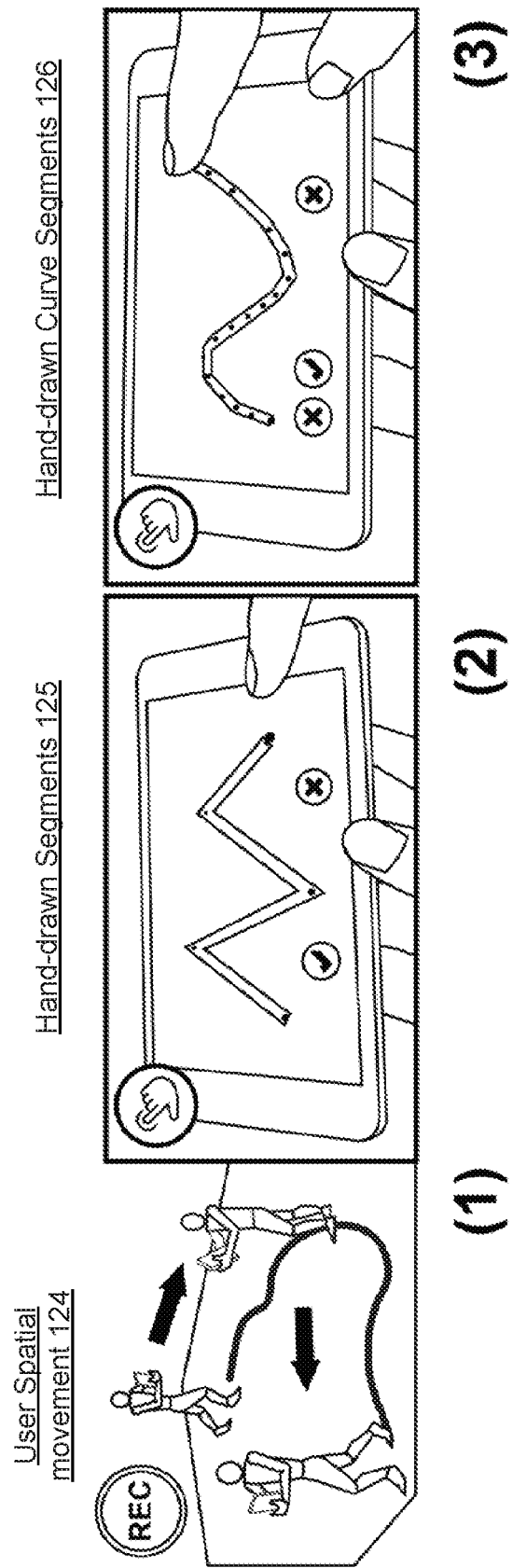
FIGS. 5A-5B depict conceptual block diagrams of an example embodiment of a process for authoring robot navigation in an AR interface in accordance with the teachings of this disclosure.
Figure 5B:
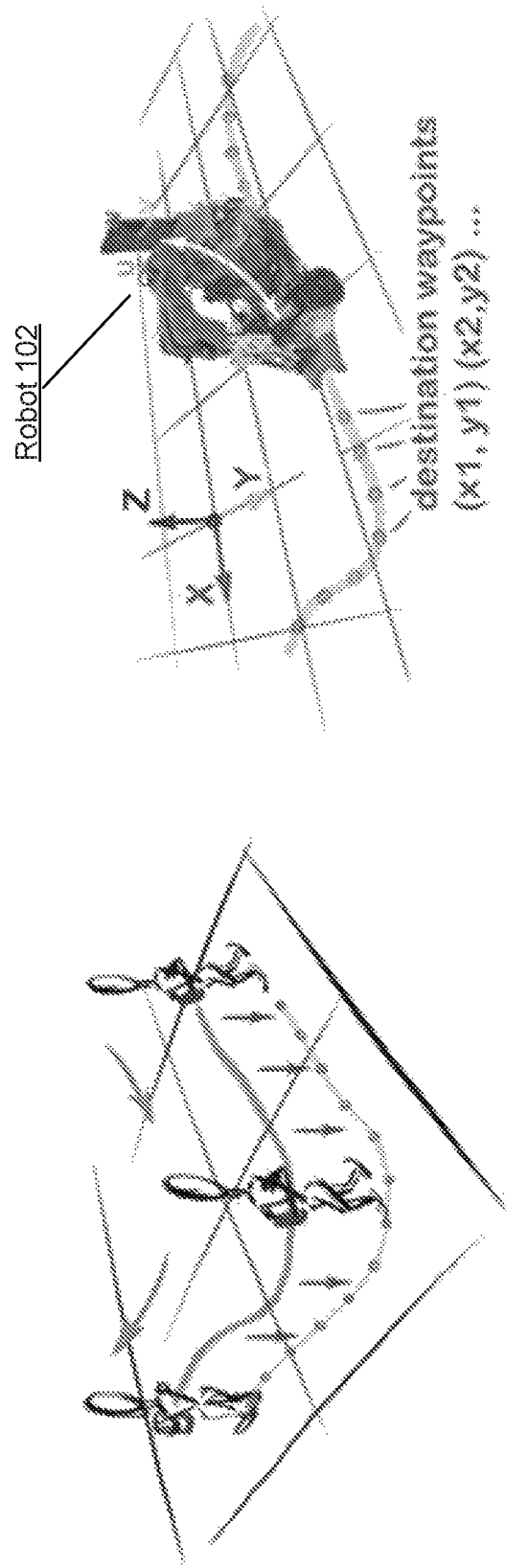

Basic task generation. FIGS. 5A-5B depict conceptual block diagrams of an example embodiment of a process for authoring robot navigation in an AR interface in accordance with the teachings of this disclosure. In the illustrated embodiment of FIG. 5A, process 500 begins by users authoring one or more navigation nodes. The authoring may be based on (i) recording spatial movement 124 of the user within the environment while carrying the mobile AR device 101 ("REC" function), (ii) hand drawn line segments 125, or (iii) hand drawn curve segments 126, or any combination thereof. The navigation nodes may comprise the majority of nodes that form a task sequence as they define the pathway for the robot to navigate in the environment. The hand-drawn method may generally be more suitable for path planning in a smaller area, whereas the REC function may be more convenient for creating large navigation paths through embodied spatial movement (e.g., across a large area or multiple rooms, etc.). Each created pathway may be broken into a series of navigation nodes that may be inserted to the end of a task sequence. After a navigation node is inserted, a pathway can be configured to be displayed in the AR scene giving the user active visual feedback.

In the illustrated embodiment of FIG. 5B, the left-hand side represents a user authoring a pathway for the programmable mobile robot to navigate through in the physical environment by recording movement of the AR-SLAM mobile device into a spatial trajectory and projecting it onto the plane of the floor plane to define the authored path using a sequence of segmented waypoints. On the right-hand side of FIG. 5B, during action mode, the mobile robot 102 compares its current location and/or orientation with one or more waypoints corresponding with the next destination in the pathway. The robot then follows the authored pathway by navigating itself through all waypoints sequentially.

Figure 6:
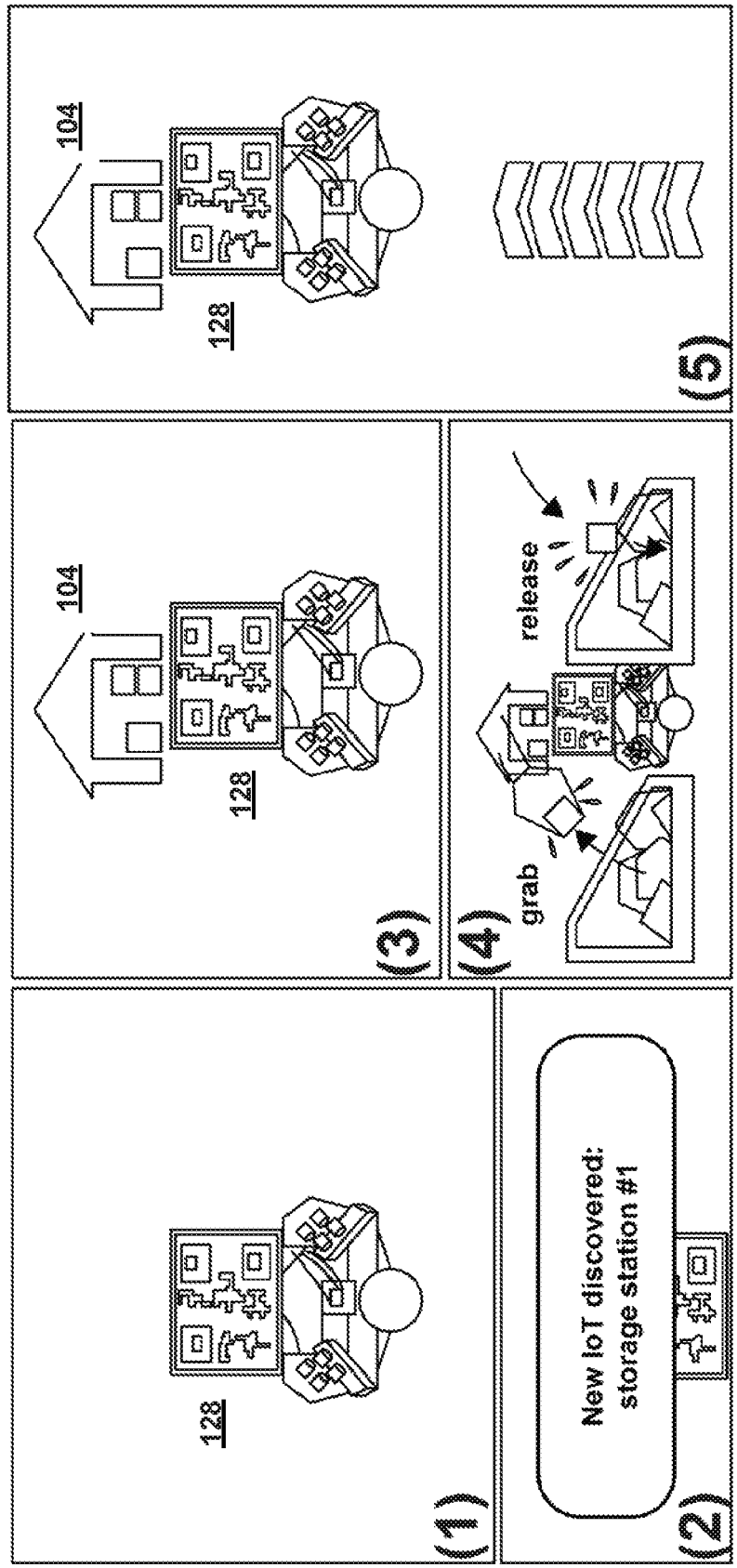
FIG. 6 depicts a conceptual block diagram of an example embodiment of a process for inserting an IoT interaction node into a navigation pathway for a programmable mobile robot in accordance with the teachings of this disclosure.

Inserting Robot-IoT interactions. FIG. 6 depicts a conceptual block diagram of an example embodiment of a process for inserting an IoT interaction node into a navigation pathway for a programmable mobile robot in accordance with the teachings of this disclosure. In the illustrated embodiment, to insert a new robot-IoT interaction node, the IoT device is first be registered into the AR scene which can be achieved through a scan of the one or more of an IoT device 104's QR codes 128 (1-2). This not only brings an interactive 3D virtual model into the AR scene (3), but may also be adapted to import semantic information into the system such as IP address and interaction protocol. After registration of the IoT device 104, users can select a virtual icon associated with the IoT device 104 in the AR interface to access the device's function list to insert one or more action nodes (4) at the end of the task sequence. When a robot-IoT interaction action node is inserted, a pathway can be configured to be displayed in the AR scene with arrows pointing towards the direction of robot travel as a visual indicator (5). Other types of action nodes can be inserted using the insert function as will be described below.

Figure 7:
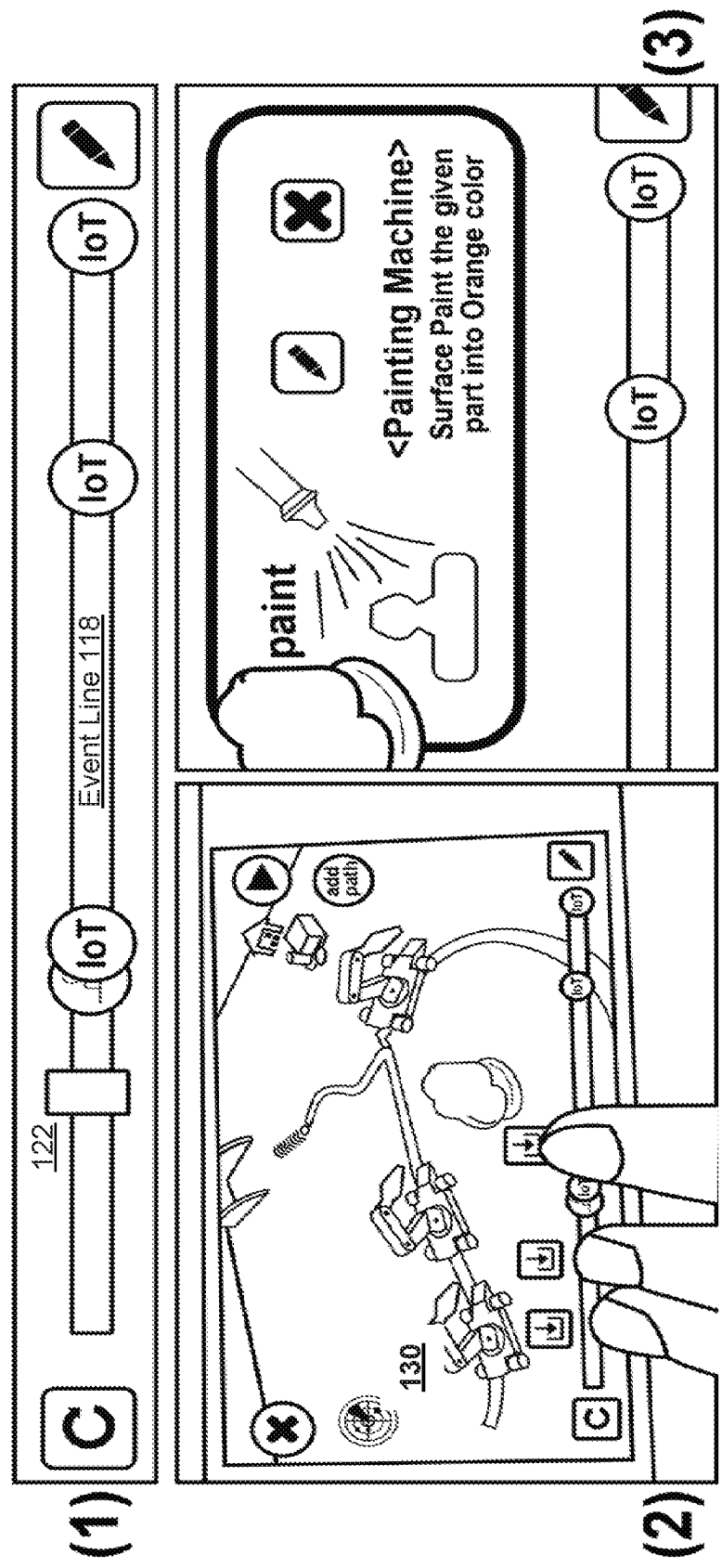
FIG. 7 depicts a conceptual block diagram of an example embodiment of an event line task visualization in accordance with the teachings of this disclosure.

Task manipulation. FIG. 7 depicts a conceptual block diagram of an example embodiment of an event line task visualization in accordance with the teachings of this disclosure. The use of the event line 118 helps visualize the task in a linear abstract form. It also provides users with an editing tool for accessing the task details visually and manipulating them. In the illustrated embodiment, (1) an event line 118 is shown representing a task sequence in a linear and compact format, (2) users can drag a slider bar 122 in the display of the AR device for previewing the operations robot 102 will perform by displaying a virtual robot running through the nodes in the task sequences in the AR interface, and (3) users can select one or more icons on the event line 118 to review its associated detailed information, edit the icon, or delete it.

While the AR view is good for spatial task visualization, it is constrained by the view of the display which can sometimes make it difficult for users to perform global monitoring and manipulation of an entire task, especially when the task is authored in a large cross-room environment. The event line 118 has been introduced to compensate for this on a handheld device. The event line 118 provides an abstract visualization of task(s) to be performed by the robot 102. The event line 118 includes the concept of a timeline used commonly in the animation industry. The difference being that, in this case, tasks are governed by events, such as robot navigation or IoT interaction, or both.

As is illustrated in FIG. 7 (1) the event line 118 comprises non-navigation nodes displayed as icons. (3) Users can select each icon to view its details, edit it, or delete it. (2) By dragging the slider bar 122 on the event line 118, users can preview tasks with a virtual robot 130 in the display to simulate pathway execution of the robot 102 to avoid unexpected errors, etc. In one aspect, whenever multiple task lines exist, only the currently selected task line may show its event line 118 on the display screen to keep the screen view clean. Users can switch the selected task line by selecting them in the AR view, and in response, the selected task line will be highlighted with an indicator flowing through it.

Figure 8:
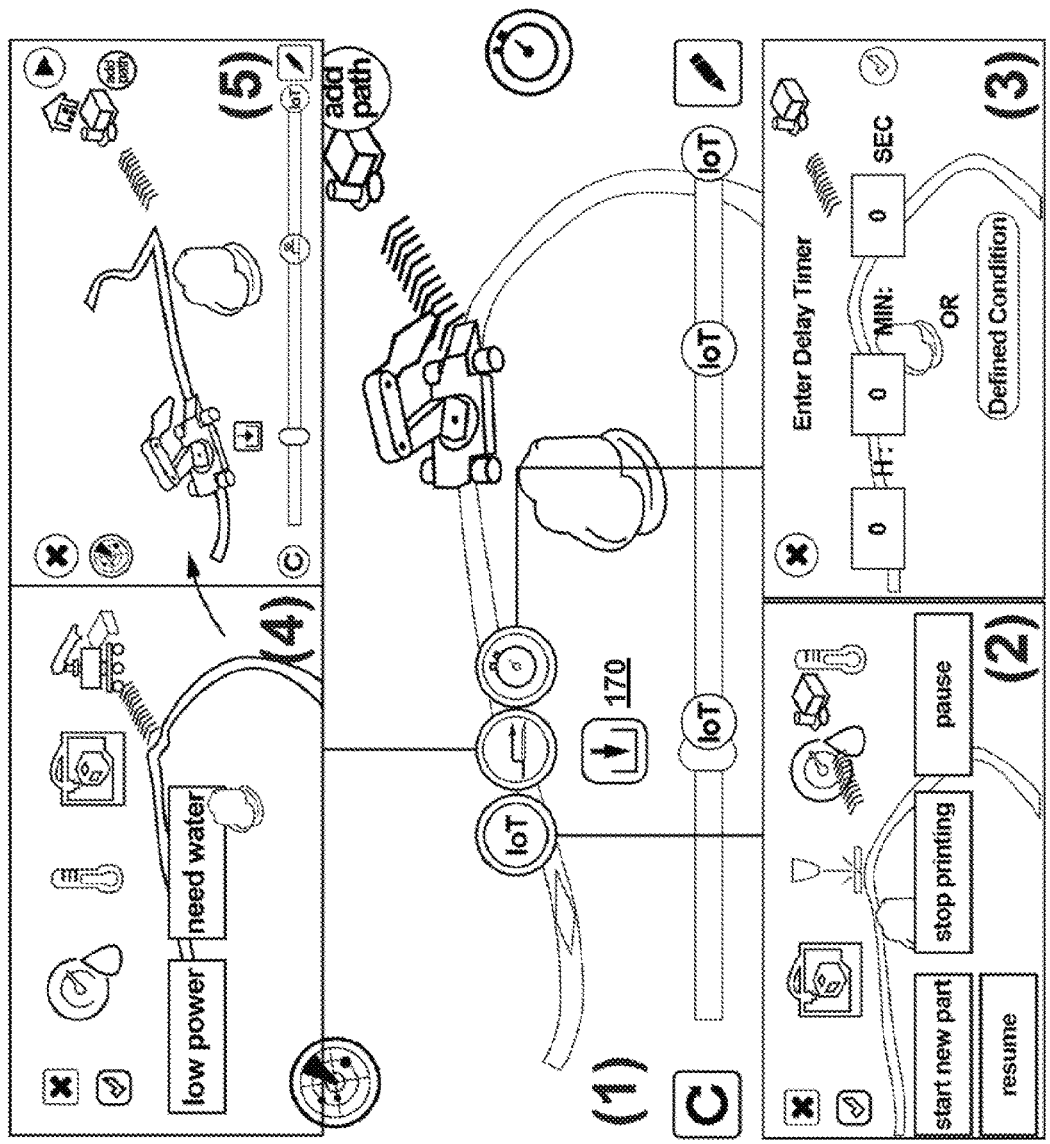
FIG. 8 depicts a conceptual block diagram of an example embodiment of a process for inserting nodes into a navigation pathway of a programmable mobile robot in accordance with the teachings of this disclosure.

Insert Function. FIG. 8 depicts a conceptual block diagram of an example embodiment of a process for inserting nodes into a navigation pathway of a programmable mobile robot in accordance with the teachings of this disclosure. In the illustrated embodiment, users can insert new nodes into the designated position in the task sequence by dragging the slider bar 122 (1), which is illustrated by the position of the virtual robot, and select a location to insert an IoT function action node (2), a time node (3), or a logic node that represents one or more logic-driven events with an alternative task line (5). In one embodiment, the nodes may be inserted in the event line 118 using a selectable icon 170 displayed above the slider bar 122. A trigger condition of the logic node may be defined from the working and sensing status of the connected IoT devices (4). These nodes may include (i) non-robotic IoT action nodes, (ii) time nodes, and/or (iii) logic nodes.

To insert an IoT function the system can be adapted to provide users with a list of the IoT devices that are connected to the system (2). Users can then select from the list, access the function of that IoT device, and insert it into a desired location with a task sequence using the icon 170. To insert a time node, for instance, users can either set a fixed wait time (3) or define a "wait-until" condition that can be triggered by the IoT device working status or sensing values.

Users can also repeat the process and create composite "AND/OR" boolean conditions as well.

In terms of logic nodes, upon selection an alternative task sequence can be generated, and users can accordingly define one or more trigger conditions which may be the same condition defining interface for the time node (4). The newly created task sequence may be configured to include the nodes prior to the insert point copied from the original task sequence which allows users to define new task lines that branch from a logic node position (5). When executing a task with multiple task sequences the system can be configured to operate from a default task sequence (i.e., the first task sequence that was generated) and decide which task sequence to continue to at the logic node based on evaluating the branch condition.

Figure 9:
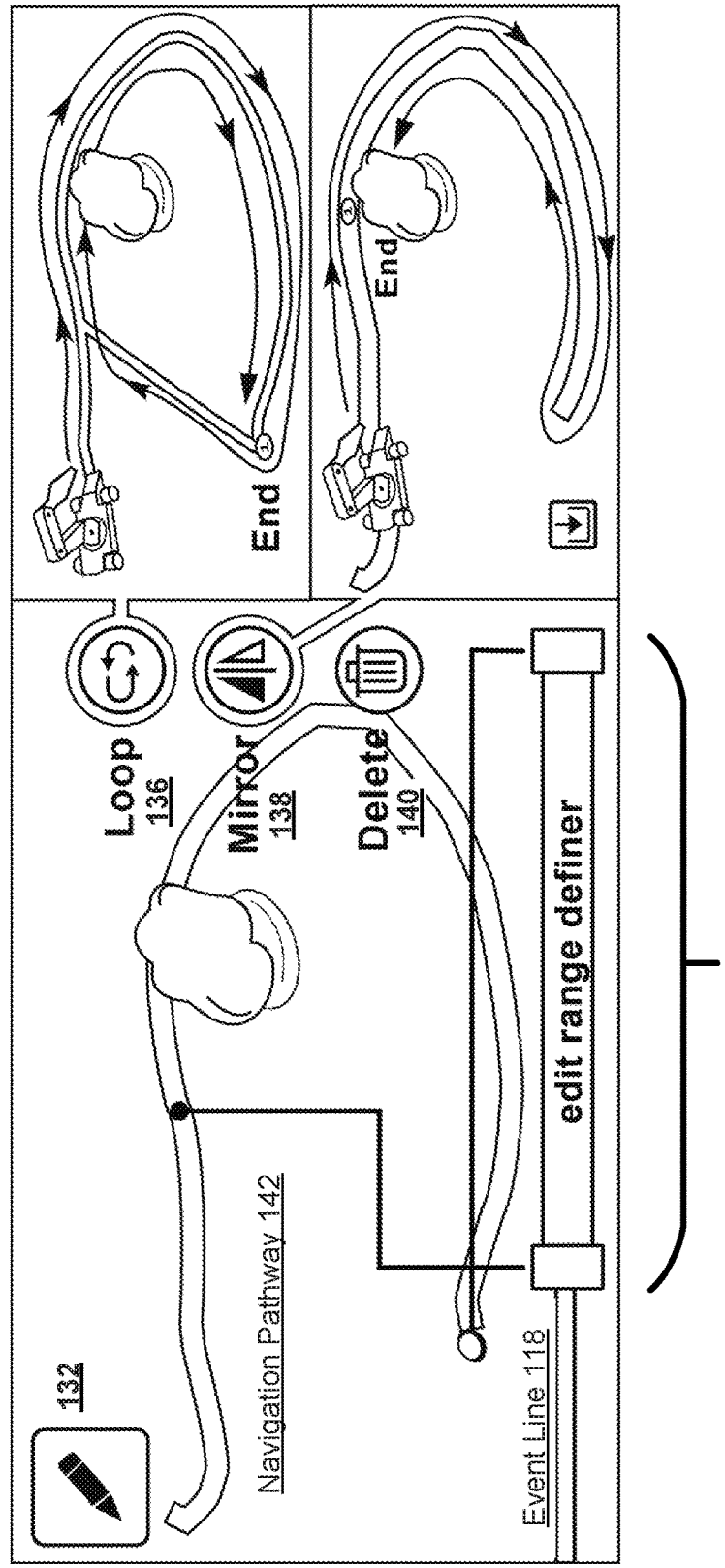
FIG. 9 depicts a conceptual block diagram of an example embodiment of a process for editing a navigation pathway for a programmable mobile robot in accordance with the teachings of this disclosure.

Edit Function. FIG. 9 depicts a conceptual block diagram of an example embodiment of a process for editing a navigation pathway for a programmable mobile robot in accordance with the teachings of this disclosure. In the illustrated embodiment, the edit function 132 includes functions for looping 136, mirroring 138, or deleting 140 an authored task. By utilizing the event line, the virtual robotic assistant system enables users to edit their authored tasks by looping, mirroring, or deleting part of the selected event line 118. The copy and mirror functions are adapted to increase the authoring efficiency for scenarios such as repeat this floor sweeping path 10 times (looping function) or return to the position from where you came (mirror function). In at least certain embodiments when accessing the edit mode 132, two interactive markers can be configured to display on the event line 118 in the AR interface delimiting a middle section that can be highlighted. Users can drag the markers along the event line on the display to define the edit range 134. The corresponding section in the AR view can also be highlighted.

Figure 10:
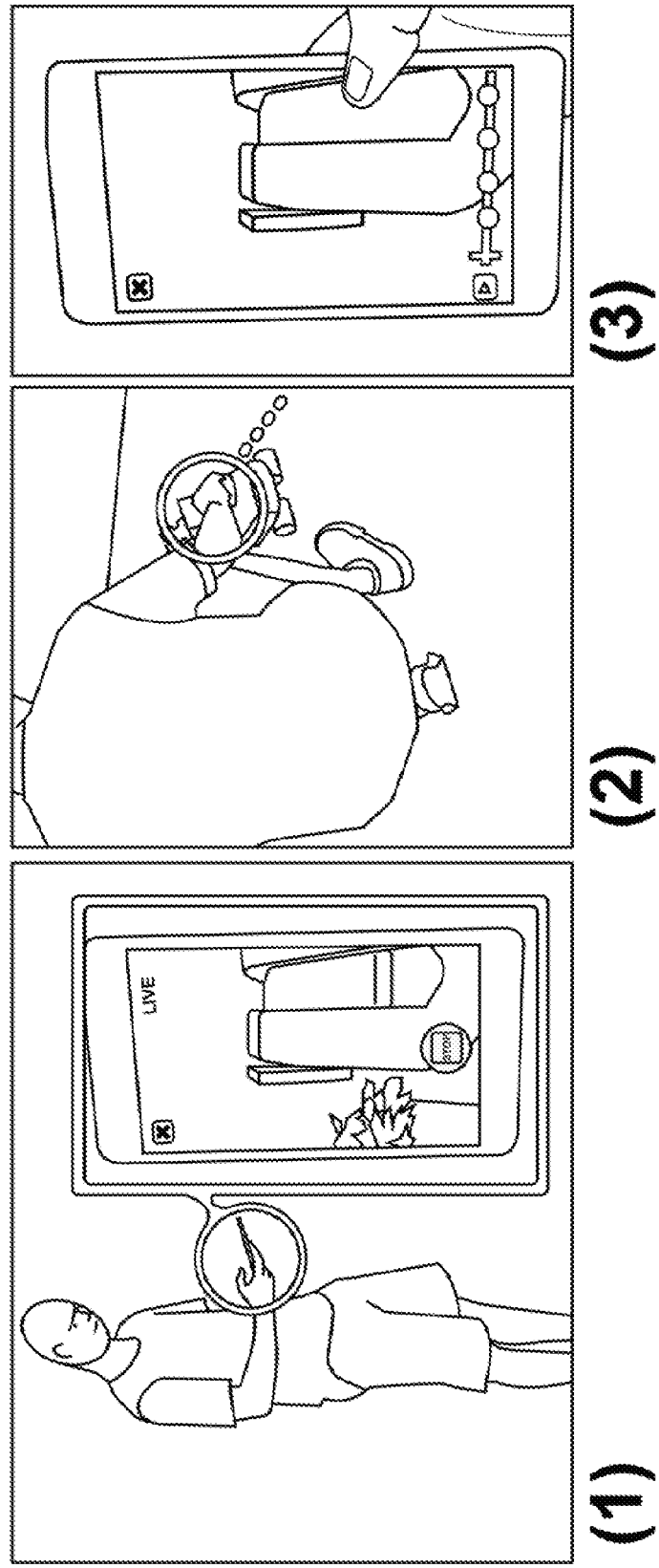
FIG. 10 depicts a conceptual block diagram of an example embodiment of certain post-play features of an authoring system for programmable robot navigation and robot-IoT interactive task planning in accordance with the teachings of this disclosure.

Post-play features. The authoring system for programmable robot navigation and robot-IoT interactive task planning's interaction does not end at the play mode. FIG. 10 depicts a conceptual block diagram of an example embodiment of certain post-play features of an authoring system for programmable robot navigation and robot-IoT interactive task planning in accordance with the teachings of this disclosure. In the illustrated embodiment, users can monitor robot execution during play mode using an external smartphone or other mobile device (1), and in response thereto, the system can create a video log that records the robot's execution (2). As illustrated in (1) the virtual robotic assistant system can be configured to enable users to live monitor task execution for the robot using an external smartphone or other mobile electronic device by video streaming via the camera of the device. Users can stop operation via a "STOP" button if they notice something goes wrong, etc. During play mode, the system can be adapted to automatically record video feeds from the camera and to generate an event-icon-embedded video log that can be stored in memory of the mobile device (2). Users can access the video log to review what happened during play mode for process analysis, debugging, etc.

Example Implementation

Software platform. In aspects, a software interface may be implemented as an application that runs on "ASUS Zenfone" AR mobile device. The AR-SLAM feature can be achieved using Google's software development kit Tango Core, and the application can be built with a "Unity3D engine." The live task monitor feature can be implemented with a "WebRTC" video stream service. It is noted that Tango Core relies a built-in depth camera to produce point cloud-based user interaction. This device was chosen due to the technology availability at the time of initial development; however, the system is not limited to a depth camera-based Tango device. The virtual robotic assistant can be configured to be fully compatible with the latest AR-SLAM platforms which may use RGB cameras of regular smartphones other mobile devices (e.g., ARCore, ARKit) for SLAM and plane detection.

Figure 11:
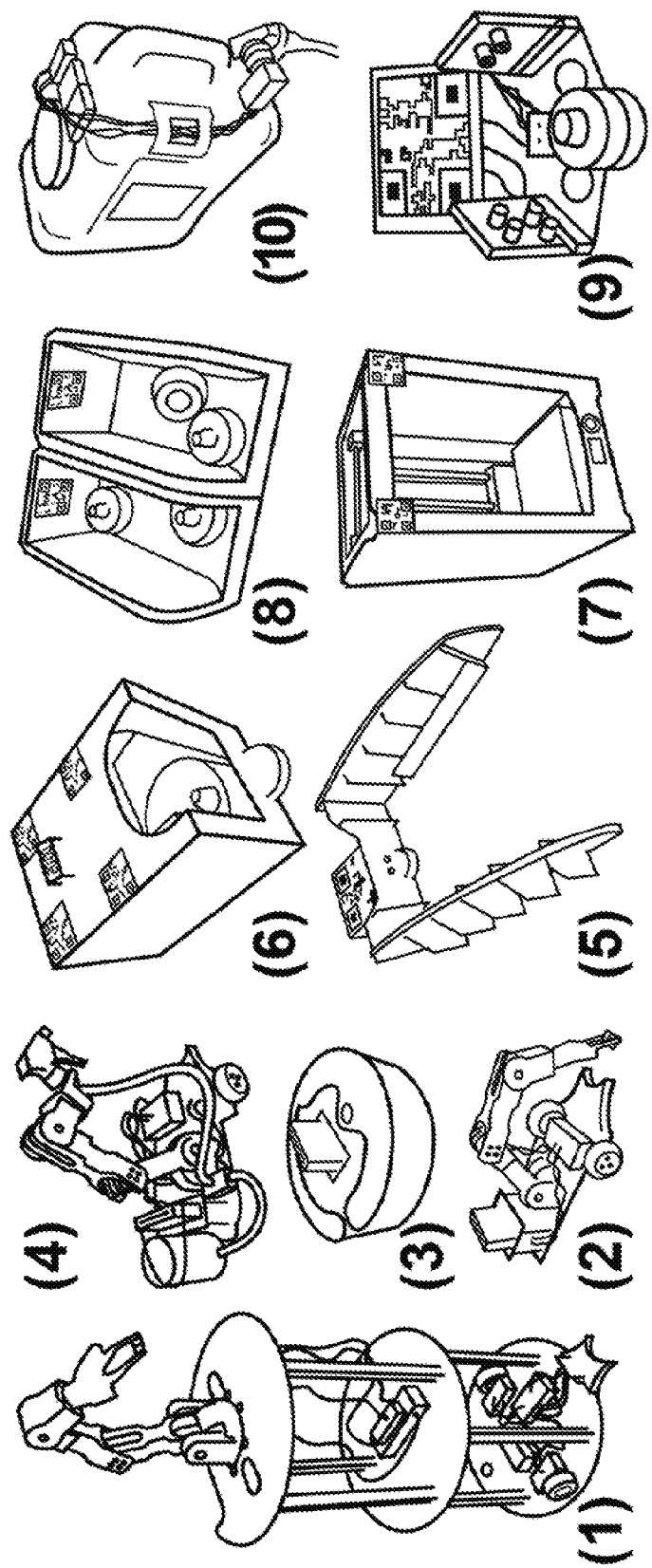
FIG. 11 depicts a conceptual block diagram of an example embodiment of prototyped mobile robots and IoT devices available for use with the authoring system for programmable robot navigation and robot-IoT interactive task planning in accordance with the teachings of this disclosure.

Hardware prototyping. FIG. 11 depicts a conceptual block diagram of an example embodiment of prototyped mobile robots and IoT devices available for use with the authoring system for programmable robot navigation and robot-IoT interactive task planning in accordance with the teachings of this disclosure. In the illustrated embodiment, as non-limiting examples, the programmed mobile robots 1100 include (1) a TowerBot, (2) a GripperBot, (3) a SweeperBot, (4) a WaterBot, (5) a charging station, (6) a painting machine, (7) a 3D printer, (8) a sorting box, (9) a storage station, and (10) a water station. To showcase the concept of the authoring system for programmable robot navigation and robot-IoT interactive task planning, four robots were prototyped (see 1-4) and six different kinds of IoT devices (5-10) can be used. The programmed mobile robots and IoT devices can be equipped with Wi-Fi communications capabilities using, for example, a UDP protocol which may be implemented using the "ESP8266" or "Arduino Mega" microcontroller (not shown). The motor functions of some robots and IoT devices may be provided by the "HerkuleX" servo and Arduino Braccio robot arm.

Robot navigation and IoT interaction. During play mode, the authoring device may instruct a robot to perform navigation and to interact with one or more IoT devices in the environment. To navigate the robot along a user-defined path, the device can constantly check its current position and orientation in the SLAM map coordinate system and compare it with coordinate information of a target node to guide the robot's movement in the physical environment. In other words, the SLAM device may perform the function of the 'eyes' for the robot for navigation through the environment.

To interact with an IoT, the robot may first dock into an interaction position of the IoT device by going through a short docking path embedded within the interaction node. All the IoT devices have similar docking targets. At the end of the docking path, when the robot reaches a close enough proximity to the docking target, it can finalize the docking process using the front color detection camera (e.g., Pixy CMUcam5). Once the robot is docked with an IoT device, manipulation (like grabbing an object from a storage station, etc.) can be performed and the interaction can proceed via a three-way communication among the authoring device, the robot, and the one or more IoT devices. For example, to grab an object from a storage station after successful docking, the robot may first query the storage station regarding how many objects are currently stacked thereon, and based on the answer, grab for different positions and then complete the robot-IoT interaction when the object(s) is retrieved.

Example Systems

Provided below is a description of example embodiments of an AR interface system for authoring tasks for execution by a programmable mobile robot in a physical environment in accordance with the techniques set forth in this disclosure. Although certain elements may be depicted as separate components, in some instances one or more of the components may be combined into a single device or system. Likewise, although certain functionality may be described as being performed by a single element or component within a system, the functionality may in some instances be performed by multiple components or elements working together in a functionally coordinated manner. In addition, hardwired circuitry may be used independently or in combination with software instructions to implement these techniques.

Further, the features and aspects described herein are not limited to any specific combination of hardware or software. For example, the described functionality may be performed by custom hardware components containing hardwired logic for performing operations, by general-purpose computer hardware containing a memory having stored thereon programmed instructions for performing operations, or by any combination of computer hardware and programmed components. The features and aspects may also be practiced in distributed computing environments, such as in a private or public cloud-based network where operations may be performed by remote processing devices or systems that are in communication via one or more wired or wireless networks.

Figure 12:
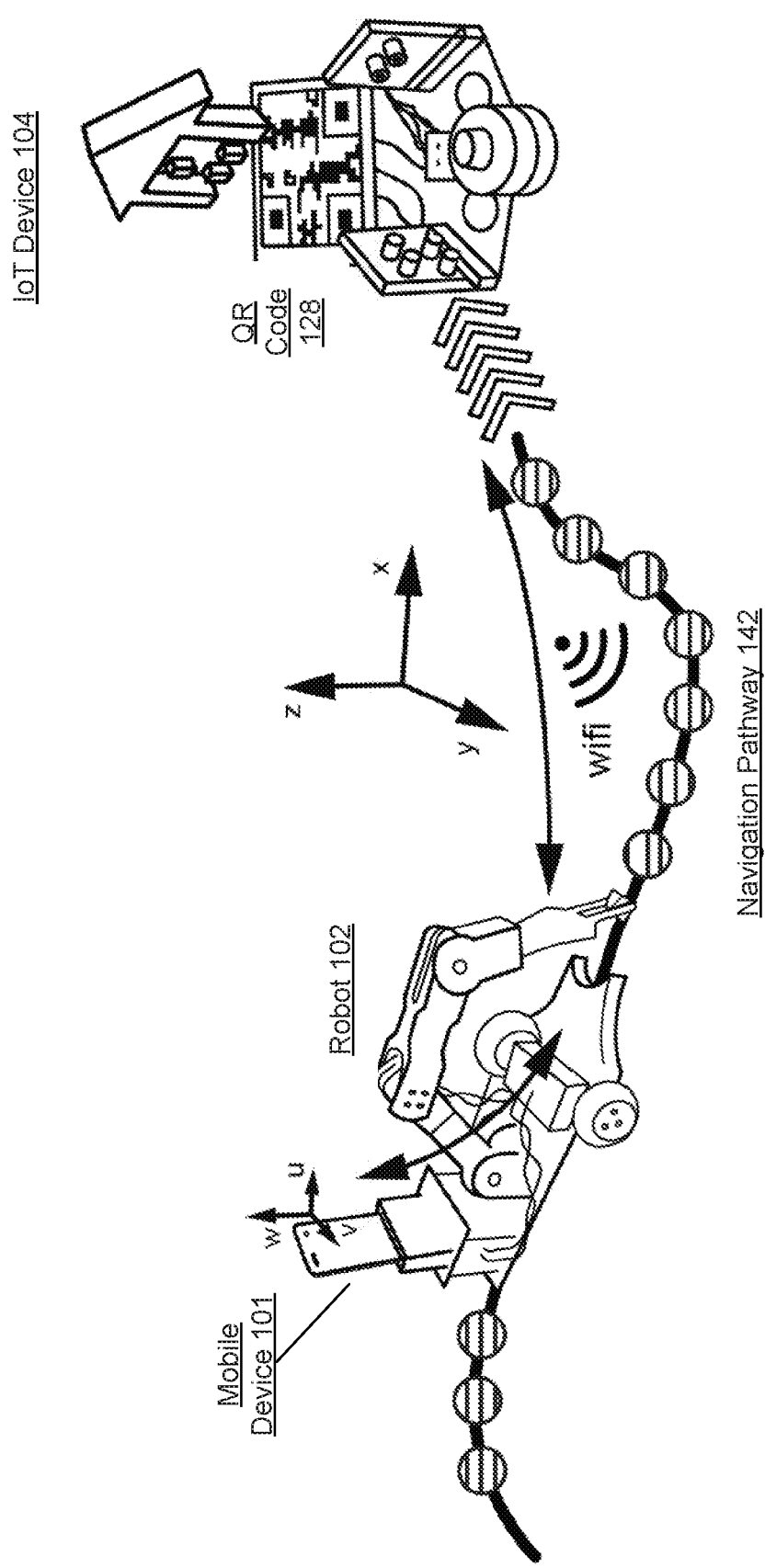
FIG. 12 depicts a conceptual block diagram of an example embodiment of an authoring system for programmable robot navigation and robot-IoT interactive task planning in accordance with the teachings of this disclosure.

FIG. 12 depicts a conceptual block diagram of an example embodiment of an authoring system for programmable robot navigation and robot-IoT interactive task planning in accordance with the teachings of this disclosure. In the illustrated embodiment, the authoring system 1200 may include a programmable mobile robot 102 configured with a microcontroller to perform one or more basic motor functions, a physical environment with a distribution of one or more IoT devices 104, and a mobile device 101 with AR-SLAM capabilities (not shown). The mobile device 101 may comprise a processor, a memory, a network interface for communications via one or more wired or wireless computer networks, a camera for recording images captured within a field-of-view ("FOV") of a display of the mobile device, and one or more sensors for estimating motion of the camera in the environment.

In one embodiment, the authoring system 1200 may include an AR interface for authoring tasks for execution by a programmable mobile robot in a physical environment. The AR interface may comprise an application running on a mobile device. The mobile device may be equipped with a camera, a display, and AR-SLAM capability for performing operations to implement the AR interface. The operations may include (i) capturing a set of images of the physical environment using the mobile device camera, (ii) generating a dynamic SLAM map comprising spatial information for displaying an AR scene in the display of the mobile device. The AR scene may be a digital representation of at least part of the physical environment. SLAM technology may be used to enable the programmable mobile robot to generate a map of its surroundings and orient itself within the SLAM map in real-time. The SLAM technology may be adapted to localize an unknown environment enabling the programmable robot to navigate through spaces for which no prior map or GPS signal is available.

In at least certain embodiments, the operations may further include (i) displaying a selectable navigation element in the AR interface for receiving an indication by users defining a navigation pathway for the programmable mobile robot to traverse along in the physical environment, (ii) displaying a selectable task element in the AR interface for receiving an indication by users defining a set of one or more tasks to be performed by the programmable mobile robot during operation, (iii) displaying a selectable element in the AR interface for receiving an indication by users defining a logic event to be evaluated during operation, and (iv) generating a task sequence comprising a set of elements selected from one or more of the selectable navigation element representing the navigation pathway the programmable mobile robot is to traverse through the physical environment, the selectable task element representing the set of tasks to be performed by the programmable mobile robot during operation, and one or more logic elements representing logic events to be evaluated by the programmable mobile robot during operation.

In aspects, the operations performed by the mobile device with AR-SLAM capability may also include (i) displaying an event line element associated with each task sequence where the event line element may comprise an interactive display of tasks to be performed in the task sequence by the programmable mobile robot during operation, (ii) displaying a slider bar element on the event line element where the slider bar element may be adapted to be dragged along the event line element for previewing tasks to be performed by the programmable mobile robot, and (iii) displaying a slider bar element on the event line element. The slider bar element may be adapted to be dragged by users along the event line element for inserting tasks to be performed by the programmable mobile robot in the task sequence at selected locations along the event line element.

In embodiments, the operations may further include (i) displaying a virtual robot representing the programmable mobile robot in the AR scene where the slider bar element is adapted to be dragged along the event line element for previewing the virtual robot traversing through the navigation pathway in the AR scene, (ii) displaying a selectable element in the AR interface for receiving an indication of an edit function for editing one or more tasks displayed on the event line element in the AR scene, (iii) displaying one or more action elements representing robot-IoT device interactions for the programmable mobile robot to perform during operation, and (iv) displaying timing elements containing information for defining time-based operations to be performed by the programmable mobile robot.

Two markers may further be displayed on the event line element in the AR scene for use in delimiting the range of the edit function. The task sequence is may be selected from multiple task sequences and the event line element associated with each selected task sequence may be displayed in the AR interface.

One or more Internet of Things (IoT) devices may be spatially registered within the dynamic SLAM map and serve as landmarks in the AR scene for navigating the programmable mobile robot through the physical environment. The functions of an IoT device may be inserted into a task sequence in response to (i) receiving a selection of an element displayed in the AR interface representing the IoT device, (ii) displaying a function list for the IoT device in response to the selection, and (iii) inserting a function selected from the function list into the task sequence at positions along the event line element indicated by the slider bar.

Each logic event may include conditions to be evaluated for determining a course of action to be taken by the programmable mobile robot. In response to selecting a logic element, an alternative task sequence with a condition and a branch from the position of the logic event in the task sequence may be generated.

Example Use Cases

Three different use cases are demonstrated to showcase the potential use of virtual robotic assistant system as set forth below.

Figure 13:
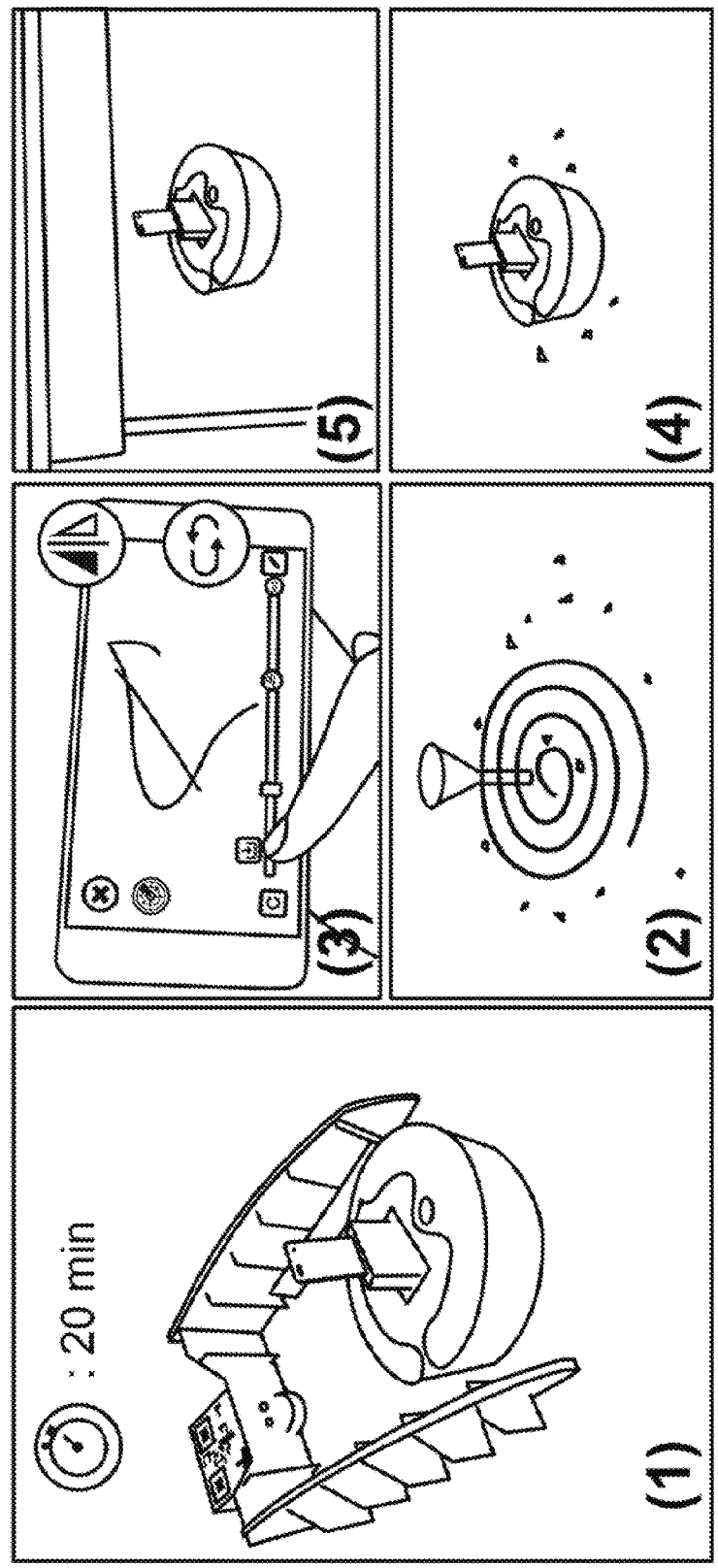
FIG. 13 depicts a conceptual block diagram of an example embodiment of a process for smart floor cleaning using a SweeperBot virtual robot assistant system in accordance with the teachings of this disclosure.

Case 1: SweeperBot for smart floor cleaning. FIG. 13 depicts a conceptual block diagram of an example embodiment of a process for smart floor cleaning using a SweeperBot virtual robot assistant system in accordance with the teachings of this disclosure. In the illustrated embodiment, process 1300 comprises battery charging for 20 minutes (1), using a SpotSweeping feature to author the floor cleaning operations (2), using the mirror and/or loop feature to author repeated sweeping paths under the table (3), the SweeperBot cleaning the floor (4), and robust navigation under the table in poor lighting conditions (5). The first use case features a SweeperBot 144 as a mock-up representation of the commercial sweeping robots for user-defined smart floor sweeping. As opposed to commercial products that try to survey the entire room with very little user interaction, the system enables users to pinpoint areas that need cleaning, thus greatly increase cleaning efficiency over prior art robots configured for this function.

In this case, the user can program the SweeperBot 144 to clean paper debris on the floor and perform intensive sweeping under the table. A power LED on the SweeperBot may be blinking, indicating a low battery status. While trying to finish task authoring without any delay, users can program the SweeperBot 144 to go into a charging station 110 to charge the robot for 20 minutes using the timer delay function (1), and then pinpoint areas for cleaning using the SweeperBot 144's functions (2). In the illustrated embodiment, users can author a curved sweeping route (3) under the table and use the "mirror" and "loop" functions to repeatedly clean that particular area. Use case 1 demonstrates how the authoring system for programmable robot navigation and robot-IoT interactive task planning can increase task efficiency by providing smart instructions. It also showcases the robustness of the system's navigation capability that the robot is able to successfully tour under the table even under poor lighting conditions (5).

Figure 14:
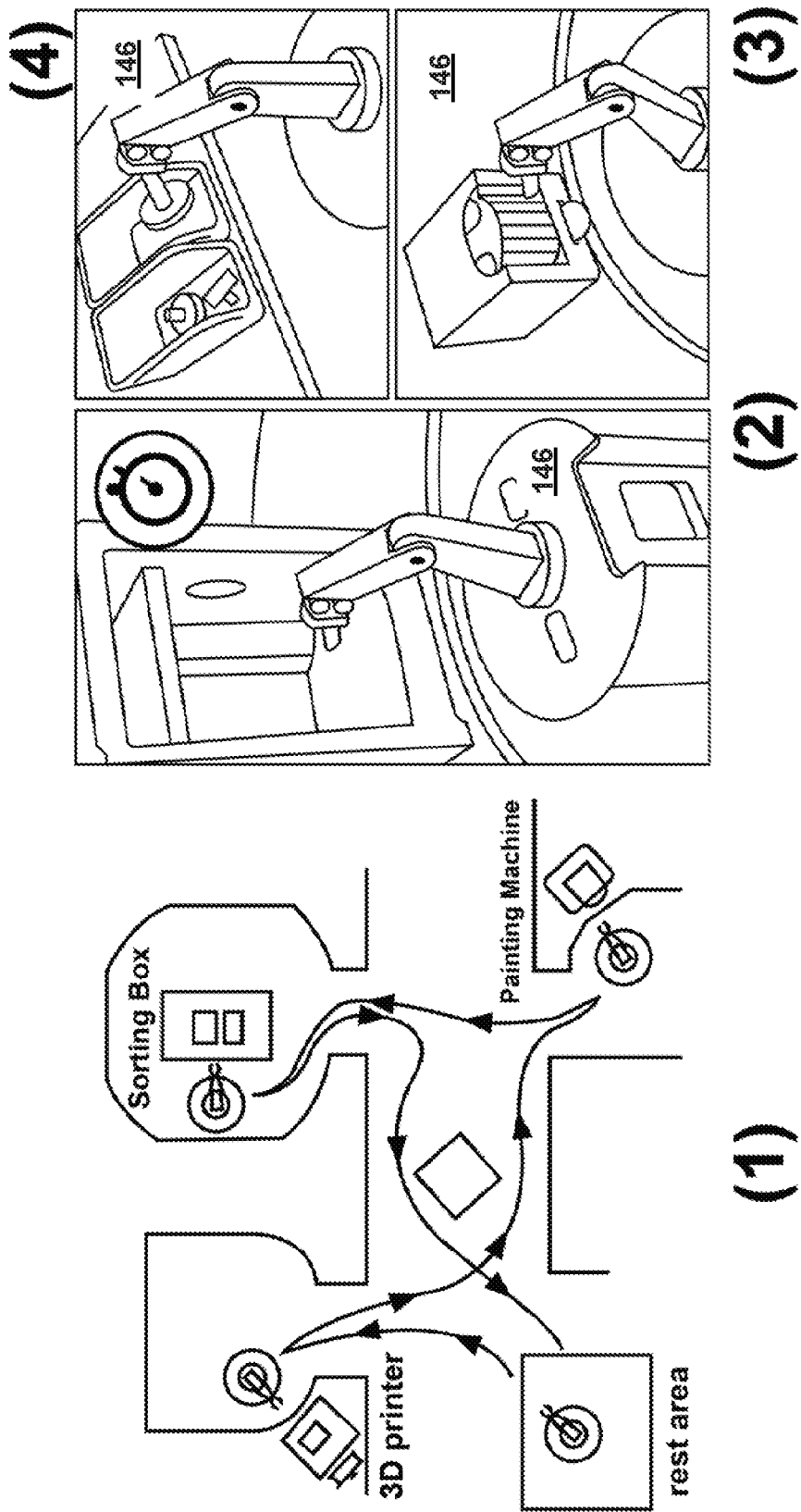
FIG. 14 depicts a conceptual block diagram of an example embodiment of a process for authoring tasks for execution by a programmable mobile robot in a physical environment that includes a distribution of one or more IoT devices accordance with the teachings of this disclosure.

Case 2: TowerBot for automated fabrication. FIG. 14 depicts a conceptual block diagram of an example embodiment of a process for authoring tasks for execution by a programmable mobile robot in a physical environment that includes a distribution of one or more IoT devices accordance with the teachings of this disclosure. In the illustrated embodiment, the process includes navigating the programmable mobile robot through a large clustered room (1), waiting for the 3D printer to finish its current printing job and then picking it up (2), applying a surface coat to a part in a painting machine (3), and placing the part inside a sorting box (4). The second use case features a TowerBot 146 in a large clustered room (1), helping makers with automated fabrication process. In this demo, the user wants to fabricate a few parts through the following process.

In the illustrated embodiment, to automate the above task and fabricate three parts, a triggered time delay may first be used for the robot 146 to wait until the 3D printer finishes printing the current part, and then picks it up (1). The user can then author the 3D printer to start printing another part. After that, the user plans the path for the TowerBot 146 to navigate through the clustered room and interact with the painting machine (3) and the sorting box (4), then comes back to a rest area to recharge its battery. Before executing, the user authors a repeat function upon the entire task for three times with an interval of one hour for battery charging. Use case 2 demonstrates a real-life application of logic triggered timing and periodically repeated task planning.

Figure 15:
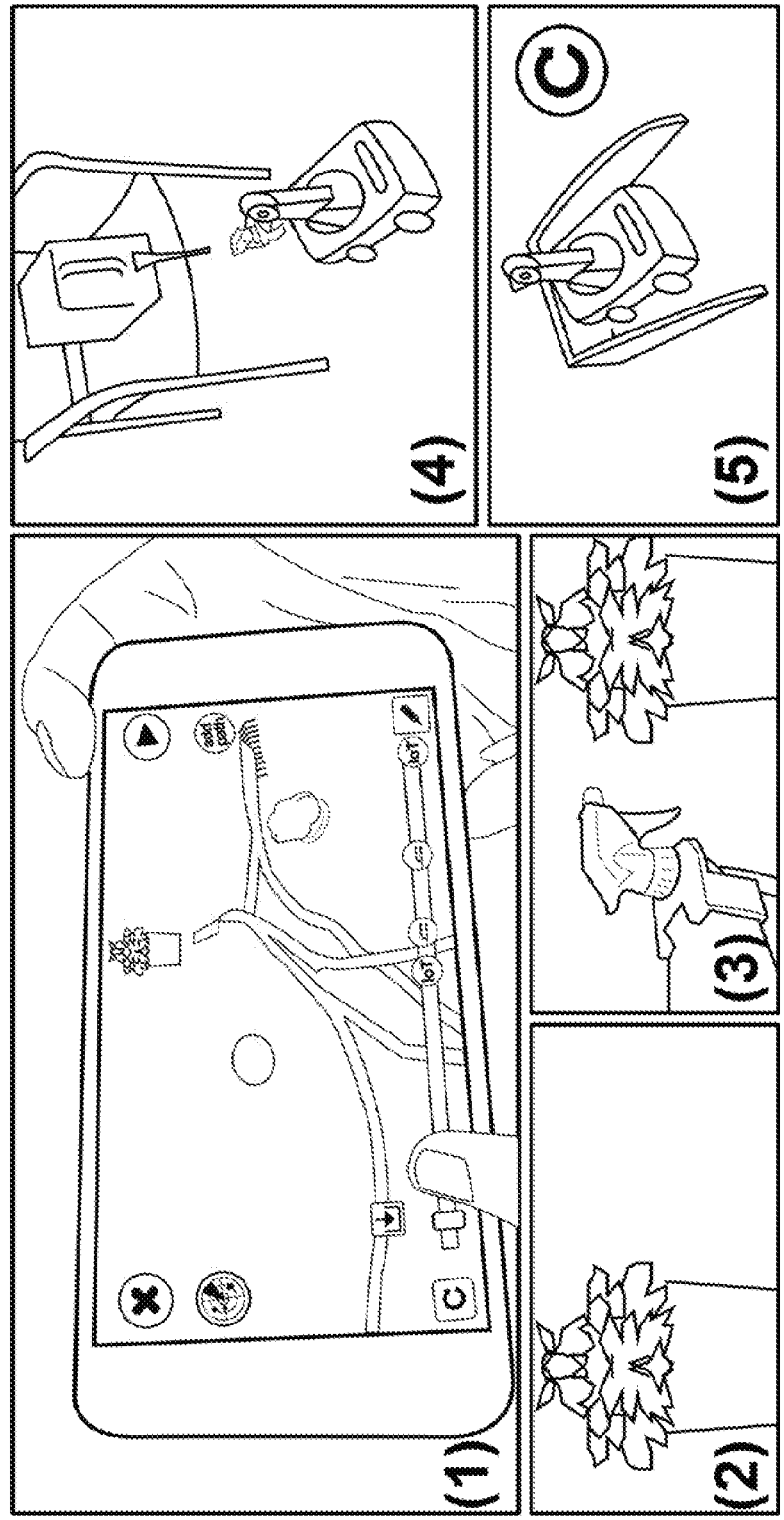
FIG. 15 depicts a conceptual block diagram example embodiment of a process for authoring multiple tasks for an authoring system for programmable robot navigation and robot-IoT interactive task planning in accordance with the teachins of this disclosure.

Case 3: WaterBot for daily plant watering. FIG. 15 depicts a conceptual block diagram example embodiment of a process for authoring multiple tasks for an authoring system for programmable robot navigation and robot-IoT interactive task planning in accordance with the teachins of this disclosure. The third use case features a WaterBot configured for automatic daily watering of household plants. In the illustrated embodiment, the process includes a user authoring multiple task lines to handle different scenarios and setting the task to repeat on a daily basis (1), the programmable mobile robot watering the flower every day (2), while watering the grass only as indicated by a moisture sensor configured on an IoT device configured to interact with the programmable mobile robot (3), the programmable mobile robot refilling the water tank when it's running out of water (4), and returning to the charging station thereafter (5).

Use case 3 could be useful in circumstances, for example, where a user is leaving for a long vacation and wants to ensure that his or her flowers and grass are well taken care of by the virtual robot assistant while away. The flower may need regular watering every day, while the grass may need much less water, and indeed, overwatering could potentially be harmful to the grass. To cater to these plants with different watering frequency, the user may first author the WaterBot to water the flower and then return to the charging station, and then repeat that task every day. On the way back to the charging station, the user may insert an alternate task line which may be triggered by a moisture sensor in the grass to cause the programmable mobile robot to water it only when needed. The user also may insert another alternate task line that may be triggered by a water level sensor configured on the WaterBot to cause it to traverse to a watering station to refill its tank when it detects its water level is running low. This use case demonstrates the virtual robot assistant system's ability to facilitate user authoring of flexible logic-driven events and shows the potential for home environment automatic plant and pet care, as non-limiting examples.

Example Processes

The following figures depict flow charts illustrating various example embodiments of processes for authoring tasks in an AR interface for execution by a programmable mobile robot in a physical environment in accordance with the techniques set forth in this disclosure in accordance with the teachings of this disclosure. It is noted that the processes described below are exemplary in nature and are provided for illustrative purposes, and not intended to limit the scope of this disclosure to any particular example embodiment. For instance, processes in accordance with some embodiments described in this disclosure may include or omit some or all of the operations described below or may include operations in a different order than described.

The particular processes described are not intended to be limited to any particular set of operations exclusive of all other potentially intermediate operations. In addition, the operations may be embodied in computer-executable code, which may cause a general-purpose or special-purpose computer processor to perform operations for providing date alignment for demand forecasts. In other instances, these operations may be performed by specific hardware components or hardwired circuitry, or by any combination of programmed computer components and custom hardware circuitry.

Figure 16A:
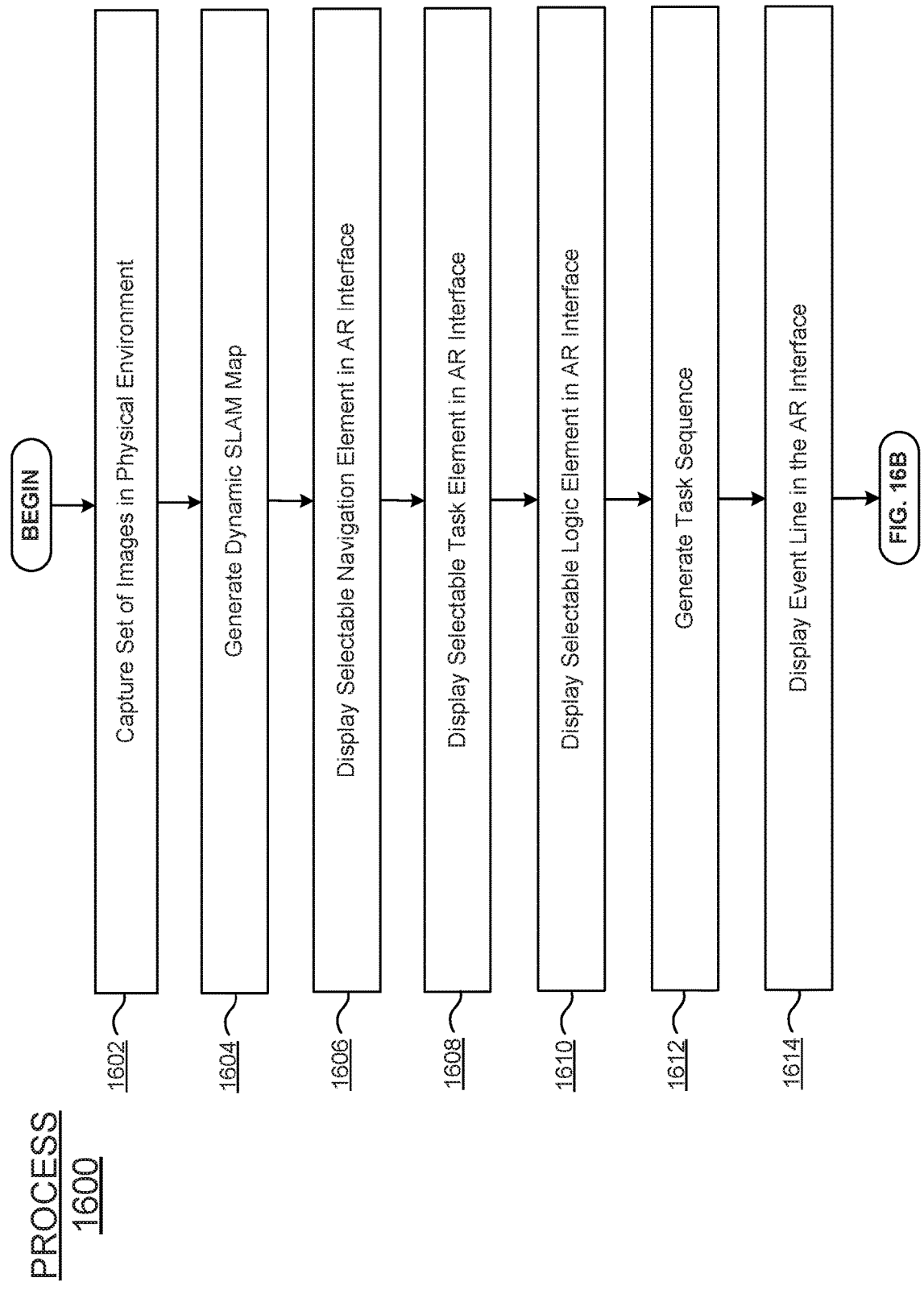

FIGS. 16A-16C depict flow charts of example embodiments of a process for authoring tasks in an AR interface for execution by a programmable mobile robot in a physical environment in accordance with the teachings of this disclosure. Process 1600 may be implemented using an application running on a mobile device with AR-SLAM capability. The mobile device may include a processor, a memory, a network interface for communications via one or more wired or wireless computer networks, a camera for recording images captured within a FOV of the mobile device display, and one or more sensors for estimating motion of the camera in the physical environment.

In the illustrated embodiment, process 1600 begins by capturing a set of images of the physical environment within the FOV of the camera of the mobile device (operation 1602), and generating a dynamic SLAM map comprising spatial information for displaying an AR scene in the mobile device display (operation 1604). In embodiments, the AR scene may comprise a digital representation of at least part of the physical environment. Process 1600 continues by displaying a selectable navigation element in the AR interface for receiving an indication defining a navigation pathway for the programmable mobile robot to traverse in the physical environment (operation 1606), displaying a selectable task element in the AR interface for receiving an indication defining a set of one or more tasks to be performed by the programmable mobile robot during operation (operation 1608), and displaying a selectable logic element in the AR interface for receiving an indication defining a logic event to be evaluated during operation (operation 1610).

Process 1600 continues to operation 1612 where a task sequence is generated that includes navigation elements representing the navigation pathway the programmable mobile robot is to traverse through the physical environment, task elements representing the set of tasks to be performed by the programmable mobile robot during operation, and logic elements representing the logic event to be evaluated by the programmable mobile robot during operation. At operation 1614, an event line element associated with each task sequence may be displayed in the AR interface. The event line element may comprise an interactive display of tasks to be performed in the task sequence by the programmable mobile robot during operation. Process 1600 continues to operation 1616 on FIG. 16B.

In the illustrated embodiment of FIG. 16B, process 1600 further includes: (i) displaying a slider bar element on the event line element, where the slider bar element is adapted to be dragged along the event line element for previewing tasks to be performed by the programmable mobile robot and for inserting tasks to be performed by the programmable mobile robot in the task sequence at selected locations along the event line element (operation 1616); (ii) displaying a virtual robot representing the programmable mobile robot in the AR scene, where the slider bar element is adapted to be dragged along the event line element for previewing the virtual robot traversing through the navigation pathway in the AR scene (operation 1618); (iii) displaying a selectable edit element in the AR interface for receiving an indication of an edit function for editing one or more tasks displayed on the event line element in the AR scene (operation 1620).

Two markers may be displayed on the event line element in the AR scene for use in delimiting a range of the edit function (see, e.g., FIG. 9—edit range 134). The task sequences may be selected from multiple task sequences and the event line element associated with each selected task sequence may be displayed in the AR interface. One or more IoT devices may be spatially registered within the dynamic SLAM map and serve as landmarks in the AR scene for navigating the programmable mobile robot through the physical environment. One or more action elements representing robot-IoT device interactions for the programmable mobile robot to perform during operation may also be displayed. This completes process 1600 according to one example embodiment.

Further, in certain aspects additional mobile devices can be configured in a multi-user system incorporating multiple cameras and displays for multiple respective users. Different icons can be rendered for landmarks in the AR scene depending on their respective different camera FOV. In some cases, the programmable mobile robot has limited functional capabilities, including basic motor functions. Task execution may be configured to be monitored by video streaming via the mobile device camera where the video streaming is recorded to generate a video log for storage in the memory of the mobile device.

In yet other aspects, SLAM technology enables the programmable mobile robot to create a map of its surroundings and orient itself within the map in real-time. The SLAM technology may be adapted to localize an unknown environment and navigates through spaces for which no prior map or GPS signal is available. FIG. 16C depicts a conceptual flow chart of an embodiment of path authoring and robot navigation based on recording spatial movement of the mobile AR-SLAM device in the physical environment. When user opens the virtual robotic assistant system and starts the task authoring, the AR-SLAM device may be configured to simultaneously initiate building an in-situ on-the-fly generated SLAM map based on what is captured inside the camera view. The SLAM map may include its own coordinate system. The SLAM map may be configured to continuously expand accumulatively while the AR-SLAM device moving around the environment in REC mode. In one aspect, during the life-cycle of virtual robotic assistant, for both task authoring and robot execution, the SLAM function may never be deactivated. This means that as long as the system is running, the virtual robotic assistant is always available to continuously build and refine the SLAM map and to use the SLAM map to localize the robot and acquire its three-dimensional positional information inside the coordinate system of the generated SLAM map.

During path authoring the system may be configured to record the authored path with segmented waypoints and store spatial information as SLAM coordinates. In the illustrated embodiment of FIG. 16C, the pathway may be authored by recording user movement while carrying the mobile device (operation 1630). The AR-SLAM device may be configured to continuously record its position and/or orientation information as a 3D trajectory localized by the SLAM capability. The 3D trajectory can then be projected onto the floor plane which may be set manually by the user (operating 1632). The pathway may then be transferred into segmented waypoints with an interval distance of, for example, in our illustrative case by 10 cm (roughly the size scale of the robot itself) (operation 1634). The authored pathway can be projected onto the ground with the segmented waypoints. In this manner, the authored pathway may be represented by a series of waypoints wherein positional information is stored in the system using coordination values of the SLAM map.

During action or play mode, the robot may be adapted to actively compare its current location and/or orientation with one or more waypoints of its next destination (operations 1636). The robot may then follow the authored path by going through the waypoints in sequential order (operation 1638). According to certain aspects, the same AR-SLAM device may be used to place onto the robot and serve as its navigation guidance. In such cases, the AR-SLAM device functions as the eyes and brains of the robot during the pathway navigation by providing its self-localization coordinates as well as coordinates of its next destination.

It is also possible to transfer the same SLAM information to a robot without using the same device but to transfer it through a cloud network or by direct peer-to-peer means. When going through the waypoints with live positional feedback from the AR-SLAM device, the robot can be designed to actively adjust its moving angle and/or speed using well known Proportional Integral Derivative (PID) control processes, for example, to ensure efficiency and smoothness of the robot navigation through all waypoints with proper motion behaviors. The camera on the mobile device may face in any direction, including the ceiling of the environment. The camera may be localized in this setting. Then the pathway the user traversed through is projected onto the ground. The robot thereafter uses the same SLAM map to localize itself and move through the projected pathway on the ground using standard control functions based on obtaining the X-Y coordinates the robot is located at for each moment in time to move to X-Y coordinates for the waypoints along the defined pathway.

As the human does, the robot can be configured to follow in order to transfer the information from the human to the robot. The information may be transferred either by placing the mobile device onto the modular slot on the robot and the same device also controls the robot (in other words robot is totally driven by the brains on the mobile device). Alternately the information can also be transferred to the robot through a cloud network and the robot can continuously use the SLAM features, i.e. SLAM is persistent. This supports the localization, i.e. the coordinates of the robot with respect to the pathway projected onto the ground (or other dimension of the physical environment) are maintained in the same overall coordinate system that the human moved around in.

This completes process 1600 according to one set of example embodiments.

With these embodiments in mind, it will be apparent from this description that aspects of the described techniques may be embodied, at least in part, in software, hardware, firmware, or any combination thereof. The techniques may be carried out in a computer system or other data processing system in response executing sequences of instructions stored in memory.

This disclosure has been described in terms of the representative embodiments disclosed herein. The above example embodiments should not be deemed to be the only embodiments and are presented to illustrate the flexibility and advantages of the described techniques. Other embodiments, implementations, and/or equivalents will be evident to those skilled in the art and may be employed without departing from the spirit and scope of this disclosure as defined by the following claims.

What is claimed is:

1. A method in an augmented-reality (AR) interface for authoring tasks for execution by a programmable mobile robot in a physical environment, the method comprising:
    at an application running on a mobile device with augmented reality simultaneous localization and mapping (AR-SLAM) capability, the mobile device comprising a processor, a memory, a network interface for communications via one or more wired or wireless computer networks, a camera for recording images captured within a field-of-view (FOV) and one or more sensors, the mobile device configured to perform the method comprising:
    capturing a set of images of the physical environment within the FOV of the camera of the mobile device;
    generating a dynamic simultaneous localization and mapping (SLAM) map comprising spatial information for displaying an AR scene in the display of the mobile device, the AR scene comprising a digital representation of at least part of the physical environment;
    displaying a selectable element in the AR interface for receiving an indication defining a navigation pathway for the programmable mobile robot to traverse in the physical environment;
    and
    in response to receiving a selection defining the navigation pathway, generating a task sequence comprising a set of navigation elements representing the navigation pathway the programmable mobile robot is to traverse through the physical environment,
    wherein one or more Internet of Things (IoT) devices are spatially registered within the dynamic SLAM map and serve as landmarks in the AR scene for navigating the programmable mobile robot in the physical environment,
    wherein functions of an IoT device are inserted into a task sequence in response to:
    receiving a selection of an element displayed in the AR interface representing the IoT device;
    displaying a function list for the IoT device in response to the selection; and
    inserting a function selected from the function list into the task sequence at a position along the event line element indicated by the position of the slider bar.

2. The method of claim 1 further comprising:
    displaying a selectable element in the AR interface for receiving an indication defining one or more tasks to be performed by the programmable mobile robot during operation;
    in response to receiving a selection defining one or more tasks to be performed, inserting one or more task elements into the task sequence, the task elements representing a set of tasks to be performed by the programmable mobile robot during operation.

3. The method of claim 1 further comprising:
    displaying a selectable element in the AR interface for receiving an indication defining one or more logic events to be evaluated during operation; and
    in response to receiving a selection defining one or more logic events to be evaluated, inserting one or more logic elements into the task sequence representing logic events to be evaluated by the programmable mobile robot during operation.

4. The method of claim 1 further comprising displaying an event line element associated with each task sequence, the event line element comprising an interactive display of tasks to be performed in the task sequence by the programmable mobile robot during operation.

5. The method of claim 4 further comprising displaying a slider bar element on the event line element, wherein the slider bar element is adapted to be dragged along the event line element for previewing tasks to be performed by the programmable mobile robot.

6. The method of claim 4 further comprising displaying a slider bar element on the event line element, wherein the slider bar element is adapted to be dragged along the event line element for inserting tasks to be performed by the programmable mobile robot in the task sequence at selected locations along the event line element.

7. The method of claim 4 further comprising displaying a virtual robot representing the programmable mobile robot in the AR scene, wherein a slider bar element is adapted to be dragged along the event line element for previewing the virtual robot traversing through the navigation pathway in the AR scene.

8. The method of claim 4 further comprising displaying a selectable element in the AR interface for receiving an indication of an edit function for editing one or more tasks displayed on the event line element in the AR scene.

9. The method of claim 8 further comprising displaying two markers on the event line element in the AR scene for use in delimiting a range of the edit function.

10. The method of claim 4 wherein a task sequence is selected from multiple task sequences and the event line element associated with the selected task sequence is displayed in the AR interface.

11. The method of claim 1 further comprising displaying one or more action elements representing robot-IoT device interactions for the programmable mobile robot to perform during operation.

12. The method of claim 1 further comprising displaying one or more timing elements containing information for defining time-based operations to be performed by the programmable mobile robot.

13. The method of claim 2 wherein each logic event includes one or more conditions to be evaluated for determining a course of action to be taken by the programmable mobile robot.

14. The method of claim 2 wherein in response to selecting a logic element, generating an alternative task sequence with a condition and a branch from the position of the logic event in the task sequence.

15. An augmented-reality (AR) interface for authoring tasks for execution by a programmable mobile robot in a physical environment, the AR interface comprising:
   an application running on a mobile device with a camera, a display, and an augmented reality simultaneous localization and mapping (AR-SLAM) capability for performing operations to implement the AR interface, the mobile device configured to perform the operations comprising:
   capturing a set of images of the physical environment within the FOV of the camera of the mobile device;
   generating a dynamic simultaneous localization and mapping (SLAM) map comprising spatial information for displaying an AR scene in the display of the mobile device, the AR scene comprising a digital representation of at least part of the physical environment;
   displaying a selectable element in the AR interface for receiving an indication defining a navigation pathway for the programmable mobile robot to traverse in the physical environment; and
   in response to receiving a selection defining the navigation pathway, generating a task sequence comprising a set of navigation elements representing the navigation pathway the programmable mobile robot is to traverse through the physical environment,
   wherein one or more Internet of Things (IoT) devices are spatially registered within the dynamic SLAM map and serve as landmarks in the AR scene for navigating the programmable mobile robot in the physical environment,
   wherein functions of an IoT device are inserted into a task sequence in response to:
   receiving a selection of an element displayed in the AR interface representing the IoT device;
   displaying a function list for the IoT device in response to the selection; and
   inserting a function selected from the function list into the task sequence at a position along the event line element indicated by the position of the slider bar.

16. The AR interface of claim 15 wherein the operations further comprise:
   displaying a selectable element in the AR interface for receiving an indication defining one or more tasks to be performed by the programmable mobile robot during operation;
   in response to receiving a selection defining one or more tasks to be performed, inserting one or more task elements into the task sequence, the task elements representing a set of tasks to be performed by the programmable mobile robot during operation.

17. The AR interface of claim 15 wherein the operations further comprise:
   displaying a selectable element in the AR interface for receiving an indication defining one or more logic events to be evaluated during operation; and
   in response to receiving a selection defining one or more logic events to be evaluated, inserting one or more logic elements into the task sequence representing logic events to be evaluated by the programmable mobile robot during operation.

18. The AR interface of claim 15 wherein the operations further comprise displaying an event line element associated with each task sequence, the event line element comprising an interactive display of tasks to be performed in the task sequence by the programmable mobile robot during operation.

19. The AR interface of claim 18 wherein the operations further comprise displaying a slider bar element on the event line element, wherein the slider bar element is adapted to be dragged along the event line element for previewing tasks to be performed by the programmable mobile robot.

20. The AR interface of claim 18 wherein the operations further comprise displaying a slider bar element on the event line element, wherein the slider bar element is adapted to be dragged along the event line element for inserting tasks to be performed by the programmable mobile robot in the task sequence at selected locations along the event line element.

21. The AR interface of claim 18 wherein the operations further comprise displaying a virtual robot representing the programmable mobile robot in the AR scene, wherein a slider bar element is adapted to be dragged along the event line element for previewing the virtual robot traversing through the navigation pathway in the AR scene.

22. The AR interface of claim 18 wherein the operations further comprise displaying a selectable element in the AR interface for receiving an indication of an edit function for editing one or more tasks displayed on the event line element in the AR scene.

23. The AR interface of claim 18 wherein the operations further comprise displaying two markers on the event line element in the AR scene for use in delimiting a range of the edit function.

24. The AR interface of claim 18 wherein a task sequence is selected from multiple task sequences and the event line element associated with the selected task sequence is displayed m the AR interface.

25. The AR interface of claim 15 wherein the operations further comprise displaying one or more action elements representing robot-IoT device interactions for the programmable mobile robot to perform during operation.

26. The AR interface of claim 15 wherein the operations further comprise displaying one or more timing elements containing information for defining time-based operations to be performed by the programmable mobile robot.

27. The AR interface of claim 17 wherein each logic event includes one or more conditions to be evaluated for determining a course of action to be taken by the programmable mobile robot.

28. The AR interface of claim 17 wherein in response to selecting a logic element, generating an alternative task sequence with a condition and a branch from the position of the logic event in the task sequence.

* * * * *